United States Patent
Maruyama et al.

(10) Patent No.: US 12,179,720 B2
(45) Date of Patent: Dec. 31, 2024

(54) BRAKE CONTROL DEVICE FOR VEHICLE

(71) Applicant: ADVICS CO., LTD., Kariya (JP)

(72) Inventors: Masaki Maruyama, Nagoya (JP); Shunya Watanabe, Kariya (JP)

(73) Assignee: ADVICS CO., LTD., Kariya (JP)

( * ) Notice: Subject to any disclaimer, the term of this patent is extended or adjusted under 35 U.S.C. 154(b) by 760 days.

(21) Appl. No.: 17/057,716

(22) PCT Filed: Jun. 21, 2019

(86) PCT No.: PCT/JP2019/024628
§ 371 (c)(1),
(2) Date: Nov. 23, 2020

(87) PCT Pub. No.: WO2020/004240
PCT Pub. Date: Jan. 2, 2020

(65) Prior Publication Data
US 2021/0197779 A1 Jul. 1, 2021

(30) Foreign Application Priority Data

Jun. 25, 2018 (JP) .................. 2018-119953

(51) Int. Cl.
*B60T 13/20* (2006.01)
*B60T 8/17* (2006.01)
(Continued)

(52) U.S. Cl.
CPC ............. *B60T 13/20* (2013.01); *B60T 8/17* (2013.01); *B60T 13/686* (2013.01); *B60T 13/161* (2013.01)

(58) Field of Classification Search
CPC .......... B60T 8/40; B60T 8/404; B60T 8/4059; B60T 8/4072; B60T 8/17; B60T 13/20; B60T 13/161; B60T 13/686
See application file for complete search history.

(56) References Cited

U.S. PATENT DOCUMENTS

| 7,976,108 B2 * | 7/2011 | Mori ..................... B60T 8/4872 303/11 |
| 8,959,909 B2 * | 2/2015 | Nishioka ............... B60T 13/745 60/545 |

(Continued)

FOREIGN PATENT DOCUMENTS

| CN | 101264759 A | 9/2008 |
| CN | 102826080 A | 12/2012 |

(Continued)

OTHER PUBLICATIONS

Translation KR-20180076339-A. (Year: 2018).*

(Continued)

*Primary Examiner* — Thomas J Williams
(74) *Attorney, Agent, or Firm* — BUCHANAN INGERSOLL & ROONEY PC

(57) ABSTRACT

A brake control device adjusts a hydraulic pressure in a wheel cylinder in response to an operation amount of a brake operation member, and includes "a pressure adjustment unit that includes an electric pump and a pressure adjustment valve and adjusts hydraulic pressure in a pressure adjustment fluid path between the electric pump and the pressure adjustment valve", and "a controller that controls the electric pump and the pressure adjustment valve". The controller calculates an operation speed equivalent amount based on the operation amount, calculates a target rotation speed based on the operation speed equivalent amount, and controls the electric pump such that an actual rotation speed of the electric pump approaches the target rotation speed.

2 Claims, 6 Drawing Sheets

(51) Int. Cl.
    *B60T 13/16*    (2006.01)
    *B60T 13/68*    (2006.01)

(56) References Cited

U.S. PATENT DOCUMENTS

| | | | |
|---|---|---|---|
| 11,787,292 B2 * | 10/2023 | Maruyama | B60L 15/2009 |
| | | | 303/3 |
| 11,807,215 B2 * | 11/2023 | Maruyama | B60T 1/10 |
| 2008/0224533 A1 | 9/2008 | Nakada et al. | |
| 2008/0300763 A1 | 12/2008 | Mori et al. | |
| 2012/0319465 A1 | 12/2012 | Koyama | |
| 2015/0291137 A1 * | 10/2015 | Takeuchi | B60T 8/34 |
| | | | 303/10 |
| 2021/0197779 A1 * | 7/2021 | Maruyama | B60T 8/17 |

FOREIGN PATENT DOCUMENTS

| | | | | | |
|---|---|---|---|---|---|
| JP | 2008296704 A | | 12/2008 | | |
| KR | 20180076339 A | * | 7/2018 | ............ | B60T 13/686 |
| KR | 20180076341 A | * | 7/2018 | ............ | B60T 13/686 |

OTHER PUBLICATIONS

Translation KR-20180076341-A. (Year: 2018).*
International Search Report (with English Translation) and Written Opinion issued in corresponding International Patent Application No. PCT/JP2019/024628, 8 pages (Aug. 20, 2019).

* cited by examiner

BRAKE CONTROL DEVICE FOR VEHICLE

TECHNICAL FIELD

The present disclosure relates to a brake control device for a vehicle.

BACKGROUND ART

For the purpose of "achieving both control accuracy and responsiveness of wheel brake hydraulic pressure control by incorporating a concept of flow rate control in a vehicle brake hydraulic pressure control device that controls, by a controller, an operation of a hydraulic pressure control unit interposed between a hydraulic pressure supply source and a wheel brake such that a hydraulic pressure in the wheel brake becomes a target hydraulic pressure." A Patent document (Japanese Unexamined Patent Application Publication No. 2008-296704) describes an invention in which "the controller includes: a target liquid amount calculator 31 that obtains a target liquid amount of the wheel brake based on a target hydraulic pressure set by a target wheel brake pressure setter 30; an actual liquid amount calculator 32 that obtains an actual liquid amount of the wheel brake based on a hydraulic pressure detected by a brake hydraulic pressure detector; and a target flow rate calculator 34 that obtains a target flow rate of the wheel brake based on the target liquid amount obtained by the target liquid amount calculator 31 and the actual liquid amount obtained by the actual liquid amount calculator 32, and controls the operation of the hydraulic pressure control unit based on the target flow rate obtained by the target flow rate calculator 34."

The patent document discloses that the target liquid amount calculator 31 and the actual liquid amount calculator 32 calculate the liquid amount in accordance with the hydraulic pressure such that the flow rate increases as the hydraulic pressure increases in accordance with a preset map (see FIG. 3). A feedforward term is obtained by differentiating the target liquid amount, and a feedback term is calculated from a liquid amount difference obtained by subtracting the actual liquid amount from the target liquid amount. The feedforward term and the feedback term are added to calculate the target flow rate, and then a control mode is determined based on the target flow rate. A solenoid valve (regulator valve 7, inlet valve 9 or outlet valve 14), and an electric motor are controlled based on the control mode.

According to the device of the patent document, the "hydraulic pressure" is converted into the "flow rate", and the brake control device is controlled based on the "flow rate". However, a final control target of the brake control device is the hydraulic pressure. Therefore, control accuracy of control based on the hydraulic pressure is higher than control accuracy of control based on the flow rate.

SUMMARY

Technical Problem

An object of the disclosure is to provide a brake control device for a vehicle which can reduce power consumption.

Solution to Problem

The brake control device for a vehicle according to the disclosure adjusts a hydraulic pressure (Pw) in a wheel cylinder (CW) in response to an operation amount (Ba) of a vehicle brake operation member (BP), and includes "a pressure adjustment unit (YA, YC) that includes an electric pump (DC) and a pressure adjustment valve (UA, UB, UC) and adjusts hydraulic pressure (Pa, Pb, Pc) in a pressure adjustment fluid path (HC) between the electric pump (DC) and the pressure adjustment valve (UA, UB, UC)"; and "a controller (ECU) that controls the electric pump (DC) and the pressure adjustment valve (UA, UB, UC)".

In the brake control device for a vehicle according to the disclosure, the controller (ECU) calculates an operation speed equivalent amount (dB, dF, dP) by using the operation amount (Ba), calculates a target rotation speed (Nt) by using the operation speed equivalent amount (dB, dF, dP), and controls the electric pump (DC) such that an actual rotation speed (Na) of the electric pump (DC) approaches the target rotation speed (Nt).

According to the above configuration, the rotation speed of the electric pump DC is increased only when an increase in the brake hydraulic pressure Pw is required, so that the brake control device SC can reduce power consumption.

DESCRIPTION OF EMBODIMENTS

Figure 1:
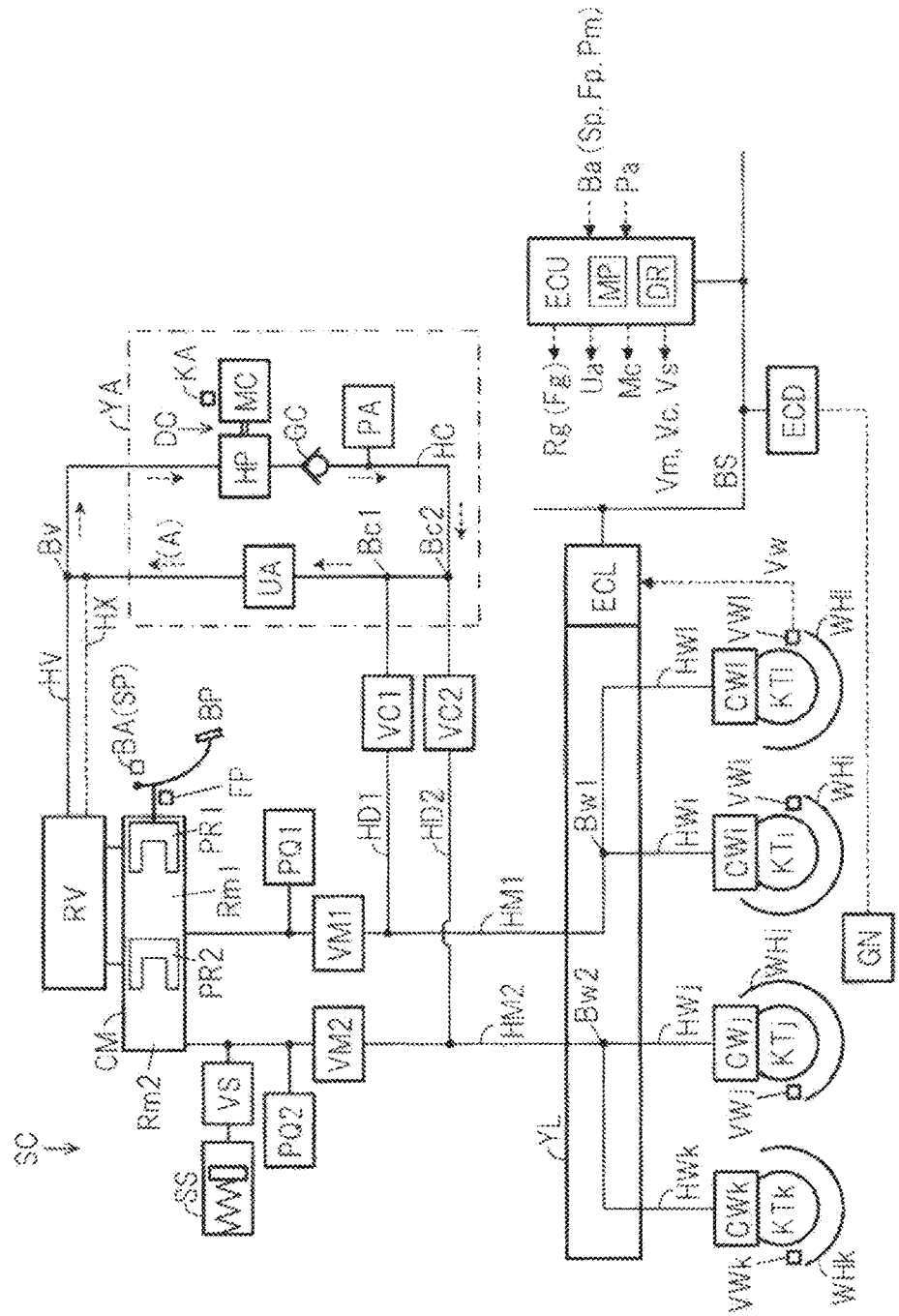
FIG. 1 is an overall configuration diagram for illustrating a first embodiment of a brake control device SC for a vehicle according to the disclosure.

<Symbols of Components, Etc. and Subscripts at End of Symbols>

In the following description, components, calculation processing, signals, characteristics, and values having the same symbols, such as "ECU", have the same functions. Subscripts "i" to "l" appended to ends of symbols relating to wheels are comprehensive symbols indicating which wheel each of the symbols is related to. Specifically, "i" denotes a right front wheel, "j" denotes a left front wheel, "k" denotes a right rear wheel, and "l" denotes a left rear wheel. For example, among four wheel cylinders, a right front wheel wheel cylinder is denoted as CWi, a left front wheel wheel cylinder is denoted as CWj, a right rear wheel wheel cylinder is denoted as CWk, and a left rear wheel wheel cylinder is denoted as CWl. The subscripts "i" to "l" at the ends of the symbols may also be omitted. When the subscripts "i" to "l" are omitted, each symbol represents a general term for each of the four wheels. For example, "WH" represents each wheel and "CW" represents each wheel cylinder.

Subscripts "1" and "2" appended to ends of symbols relating to diagonal type braking systems are comprehensive symbols indicating which system of the two braking systems each of the symbols is related to. Specifically, "1" indicates a first system, and "2" indicates a second system. For example, in two master cylinder fluid paths, a first master cylinder valve is denoted as VM1 and a second master cylinder valve is denoted as VM2. The subscripts "1" and "2" at the ends of the symbols may also be omitted. When the subscripts "1" and "2" are omitted, each symbol represents a general term for each of the two braking systems. For example, "VM" represents the master cylinder valve of each braking system.

Subscripts "f" and "r" appended to ends of symbols relating to front and rear type braking system are comprehensive symbols indicating which system of front and rear wheels each of the symbol is related to. Specifically, "f" indicates a front wheel system and "r" indicates a rear wheel system. For example, among wheel cylinders CW of all the wheels, front wheel wheel cylinders are denoted as CWf (=CWi, CWj) and rear wheel wheel cylinders are denoted as CWr (=CWk, CWl). The subscripts "f" and "r" at the ends of the symbols may also be omitted. When the subscripts "f" and "r" are omitted, each symbol represents a general term for each of the two braking systems. For example, "CW" represents wheel cylinders in the front and rear type braking system.

In a fluid path, a side closer to a reservoir RV (a side away from the wheel cylinder CW) is referred to as an "upper portion", and a side closer to the wheel cylinder CW (a side away from the reservoir RV) is referred to as a "lower portion". In addition, in recirculation (A) of a brake liquid BF, a side closer to a discharge portion of a fluid pump HP is referred to as an "upstream side", and a side away from the discharge portion is referred to as a "downstream side".

<First Embodiment of Brake Control Device SC>

A first embodiment of a brake control device SC according to the disclosure will be described with reference to an overall configuration diagram of FIG. 1. In the first embodiment, a so-called diagonal type (also referred to as "X type") is employed as a two-system fluid path. Here, the fluid path is a path for moving the brake liquid BF, which is a working liquid of the brake control device SC, and corresponds to a brake pipe, a flow path of a fluid unit, a hose, and the like. A so-called front and rear type fluid path may be employed as the two-system fluid path.

A vehicle is a hybrid vehicle including an electric motor GN for driving, or an electric automobile. The electric motor GN for driving also functions as a generator for energy regeneration (power generator). For example, the generator GN is provided in front wheels WHi and WHj (=WHf). The vehicle includes a brake operation member BP, wheel cylinders CWs, a reservoir RV, a master cylinder CM, a lower portion fluid unit YL, and wheel speed sensors VWs.

The brake operation member (for example, brake pedal) BP is a member operated by a driver to decelerate the vehicle. When the brake operation member BP is operated, braking torque of the wheel WH is adjusted, and a braking force is generated in the wheel WH. Specifically, a rotation member (for example, a brake disk) KT is fixed to the wheel WH of the vehicle. A brake caliper is disposed so as to sandwich the rotation member KT.

The brake caliper is provided with the wheel cylinder CW. By increasing a pressure (brake hydraulic pressure) Pw of the brake liquid BF in the wheel cylinder CW, a friction member (for example, brake pad) is pressed against the rotation member KT. Since the rotation member KT and the wheel WH are fixed so as to rotate integrally, the braking torque (friction braking force) is generated in the wheel WH due to a frictional force generated at this time.

The reservoir (atmospheric pressure reservoir) RV is a tank for working liquid, and the brake liquid BF is stored therein. The master cylinder CM is mechanically connected to the brake operation member BP via a brake rod or the like. A tandem type master cylinder CM is employed as the master cylinder CM. When the brake operation member BP is not operated, the master cylinder CM and the reservoir RV are in communication with each other. When the brake operation member BP is operated, a piston PR in the master cylinder CM is pushed and advanced. As a result, first and second master cylinder chambers Rm1 and Rm2 formed by an inner wall of the master cylinder CM and first and second master pistons PR1 and PR2 are cut off from the reservoir RV. When an operation of the brake operation member BP is increased, a volume of the master cylinder chamber Rm decreases, and the brake liquid BF is pressure-fed from the master cylinder CM.

First and second master cylinder fluid paths HM1 and HM2 are connected to the master cylinder CM. Wheel cylinder fluid paths HWi to HWl are connected to wheel cylinders CWi to CWl. The master cylinder fluid path HM is branched into the wheel cylinder fluid paths HW at a portion Bw in the lower portion fluid unit YL. Therefore, the first master cylinder chamber Rm1 is connected to the wheel cylinders CWi and CWl, and the second master cylinder chamber Rm2 is connected to the wheel cylinders CWj and CWk.

The lower portion fluid unit YL is a known fluid unit for executing anti-skid control, vehicle stabilization control and the like. The lower portion fluid unit YL includes an electric pump and a plurality of solenoid valves. These components are controlled by a lower portion controller ECL.

Each wheel WH is provided with a wheel speed sensor VW so as to detect a wheel speed Vw. A signal of the wheel speed Vw is used for the anti-skid control that prevents a lock tendency of the wheel WH or the like. Each wheel speed Vw detected by the wheel speed sensor VW is input to the lower portion controller ECL. In the controller ECL, a vehicle body speed Vx is calculated based on the wheel speed Vw.

<<Brake Control Device SC>>

The brake control device SC includes an operation amount sensor BA, a stroke simulator SS, a simulator valve VS, master cylinder valves VM, a pressure adjustment unit YA, and an upper portion controller ECU.

The operation amount sensor BA is provided to detect an operation amount Ba of the brake operation member (brake pedal) BP operated by the driver. At least one of a master cylinder hydraulic pressure sensor PQ that detects a pressure Pm of the master cylinder CM, an operation displacement sensor SP that detects operation displacement Sp of the brake operation member BP, and an operation force sensor FP that detects an operation force Fp of the brake operation member BP is employed as the brake operation amount sensor BA. That is, at least one of the hydraulic pressure Pm in the master cylinder CM (master cylinder hydraulic pressure), the operation displacement Sp of the brake operation member BP, and the operation force Fp of the brake operation member BP is detected by the operation amount sensor BA as the brake operation amount Ba.

The stroke simulator (also simply referred to as the "simulator") SS is provided to generate the operation force Fp on the brake operation member BP. The simulator SS includes a piston and an elastic body (for example, a compression spring) therein. The brake liquid BF is moved from the master cylinder CM to the simulator SS, and the piston is pushed by the brake liquid BF flowing into the simulator SS. A force is applied to the piston by the elastic body in a direction that blocks inflow of the brake liquid BF. The operation force Fp is formed by the elastic body when the brake operation member BP is operated.

The simulator valve VS is provided between the master cylinder chamber Rm and the simulator SS. The simulator valve VS is a two-position solenoid valve (also referred to as an "ON/OFF valve") having an open position (communication state) and a closed position (cut-off state). A normally-closed solenoid valve is employed as the simulator valve VS. The simulator valve VS is controlled by a drive signal Vs from the controller ECU. When the brake control device SC is activated, the simulator valve VS is set to the open position, and the master cylinder CM and the simulator SS are brought into a communication state. Operation characteristics (relationship between the operation displacement Sp and the operation force Fp) of the brake operation member BP are formed by the simulator SS. In a case where a volume of the master cylinder chamber Rm is sufficiently large, the simulator valve VS can be omitted.

First and second master cylinder valves VM1 and VM2 are provided in the middle of the first and second master cylinder fluid paths HM1 and HM2 (between the master cylinder CM and the lower portion fluid unit YL). Each master cylinder valve VM is a two-position solenoid valve (ON/OFF valve) having an open position (communication state) and a closed position (cut-off state). A normally-opened solenoid valve is employed as the master cylinder valve VM. The master cylinder valve VM is controlled by a drive signal Vm from the controller ECU. When the brake control device SC is activated (when a start switch is turned on), the master cylinder valve VM is set to the closed position, and the master cylinder CM and the wheel cylinder CW are brought into the cut-off state (non-communication state). The brake hydraulic pressure Pw is controlled by the pressure adjustment unit YA.

[Pressure Adjustment Unit YA]

The pressure adjustment unit YA includes an electric pump DC, a check valve GC, a pressure adjustment valve UA, an adjustment hydraulic pressure sensor PA, and separation valves VCs.

The electric pump DC includes an electric motor MC and a fluid pump HP. The electric motor MC and the fluid pump HP are fixed in the electric pump DC such that the electric motor MC and the fluid pump HP rotate integrally. The electric pump DC (in particular, the electric motor MC) is a power source for increasing the brake hydraulic pressure Pw. The electric motor MC is controlled by the upper portion controller ECU. For example, a three-phase brushless motor is employed as the electric motor MC.

A reservoir fluid path HV is connected to an absorption port of the fluid pump HP. A pressure adjustment fluid path HC is connected to a discharge port of the fluid pump HP. By driving the electric pump DC (in particular, the fluid pump HP), the brake liquid BF is absorbed through the absorption port from the reservoir fluid path HV and discharged from the discharge port to the pressure adjustment fluid path HC. For example, a gear pump is employed as the fluid pump HP.

The check valve GC (also referred to as a "check valve") is interposed in the pressure adjustment fluid path HC. For example, the check valve GC is provided near the discharge portion of the fluid pump HP. The check valve GC allows the brake liquid BF to move from the reservoir fluid path HV to the pressure adjustment fluid path HC, and prevents the brake liquid BF from moving from the pressure adjustment fluid path HC toward the reservoir fluid path HV (that is, backflow of the brake liquid BF).

The pressure adjustment valve UA is connected to the pressure adjustment fluid path HC and the reservoir fluid path HV. The pressure adjustment valve UA is a linear solenoid valve (also referred to as "proportional valve" or "differential pressure valve") in which a valve opening amount (lift amount) is continuously controlled based on an energization state (for example, supply current). A normally-opened solenoid valve is employed as the pressure adjustment valve UA. The pressure adjustment valve UA is controlled by the upper portion controller ECU based on a drive signal Ua.

When the electric pump DC is operated, the brake liquid BF recirculates in an order of "HV to HP to GC to UA to HV" as shown by a broken line arrow (A). That is, in the pressure adjustment unit YA, a recirculation path of the brake liquid BF (a fluid path in which a flow of the brake liquid BF returns to an original flow) including the fluid pump HP, the check valve GC, and the pressure adjustment valve UA is formed.

The pressure adjustment valve UA may be connected to the reservoir RV via a second reservoir fluid path HX that is different from the first reservoir fluid path HV. In this case, the recirculation path (A) of the brake liquid BF includes the reservoir RV, and is in an order of "HV to HP to GC to UA to HX to RV to HV".

When the pressure adjustment valve UA is in a fully open state (when not energized, since the pressure adjustment valve UA is normally-opened), hydraulic pressure (adjustment hydraulic pressure) Pa in the pressure adjustment fluid path HC is low, and is approximately "0 (atmospheric pressure)". When an energization amount supplied to the pressure adjustment valve UA is increased and the recirculation path (A) is narrowed by the pressure adjustment valve UA, the adjustment hydraulic pressure Pa is increased. That is, the adjustment hydraulic pressure Pa is adjusted by an orifice effect of the pressure adjustment valve UA. The adjustment hydraulic pressure sensor PA is provided in the pressure adjustment fluid path HC (in particular, between the check valve GC and the pressure adjustment valve UA) so as to detect the adjustment hydraulic pressure Pa. The detected adjustment hydraulic pressure Pa is input to the controller ECU.

The pressure adjustment fluid path HC is connected to the first and second master cylinder fluid paths HM1 and HM2 via first and second introduction fluid paths HD1 and HD2. Specifically, each introduction fluid path HD is connected between a portion Bc that is between the pressure adjustment valve UA and the check valve GC in the pressure adjustment fluid path HC and a portion Bw below the master cylinder valve VM in the master cylinder fluid path HM. The separation valve VC is provided on the way of the introduction fluid path HD. The separation valve VC is a two-position solenoid valve (ON/OFF valve) having an open position and a closed position. A normally-closed solenoid valve is employed as the separation valve VC. The separation valve VC is controlled by a drive signal Vc from the controller ECU. When the brake control device SC is activated, the separation valve VC is set to the open position. Therefore, when the brake control device SC is operated, since the master cylinder valve VM is set to the closed position, the adjustment hydraulic pressure Pa is introduced (supplied) from the pressure adjustment unit YA to the wheel cylinders CWs. That is, the same adjustment hydraulic pressure Pa is supplied to the wheel cylinders CWi to CWl. This control is referred to as "equivalent pressure adjustment".

The upper portion controller (also referred to as "upper portion electronic control unit") ECU includes a microprocessor MP, an electric circuit board where a drive circuit DR is mounted, and a control algorithm programmed in the microprocessor MP. The electric motor MC and the various solenoid valves VM, VS, VC, and UA are controlled by the controller ECU based on the brake operation amount Ba, the vehicle body speed Vx, and the adjustment hydraulic pressure Pa. Specifically, based on the control algorithm in the microprocessor MP, the drive signals Vm, Vs, Vc, and Ua for controlling the various solenoid valves VM, VS, VC, and UA are calculated. A drive signal Mc for controlling the electric motor MC is calculated in the same way. Based on these drive signals Vm, Vs, Vc, Ua and Mc, the solenoid valves VM, VS, VC, UA, and the electric motor MC are driven.

The controller ECU is network-connected to another controller (electronic control unit) via an in-vehicle communication bus BS. A regeneration amount Rg is transmitted from the controller ECU to a drive controller ECD so as to execute cooperative control (so-called regenerative cooperative control) between friction braking and regenerative braking. The "regeneration amount Rg" is a state quantity (including Fg and Fx) indicating magnitude of a regenerative braking force generated by the drive motor GN. In addition, the vehicle body speed Vx calculated by the lower portion controller ECL is transmitted to the upper portion controller ECU via the communication bus BS.

The controller ECU is provided with the drive circuit DR so as to drive the solenoid valves VM, VS, VC, UA, and the electric motor MC. A bridge circuit is formed in the drive circuit DR by a switching element (power semiconductor device such as MOS-FET or IGBT) so as to drive the electric motor MC. An energization state of each switching element is controlled based on the motor drive signal Mc, and output of the electric motor MC is controlled. In addition, in the drive circuit DR, excitation states of the solenoid valves VM, VS, VC, and UA are controlled based on the drive signals Vm, Vs, Vc, and Ua so as to drive the solenoid valves VM, VS, VC, and UA.

<First Processing Example of Pressure Adjustment Control>

Figure 2:
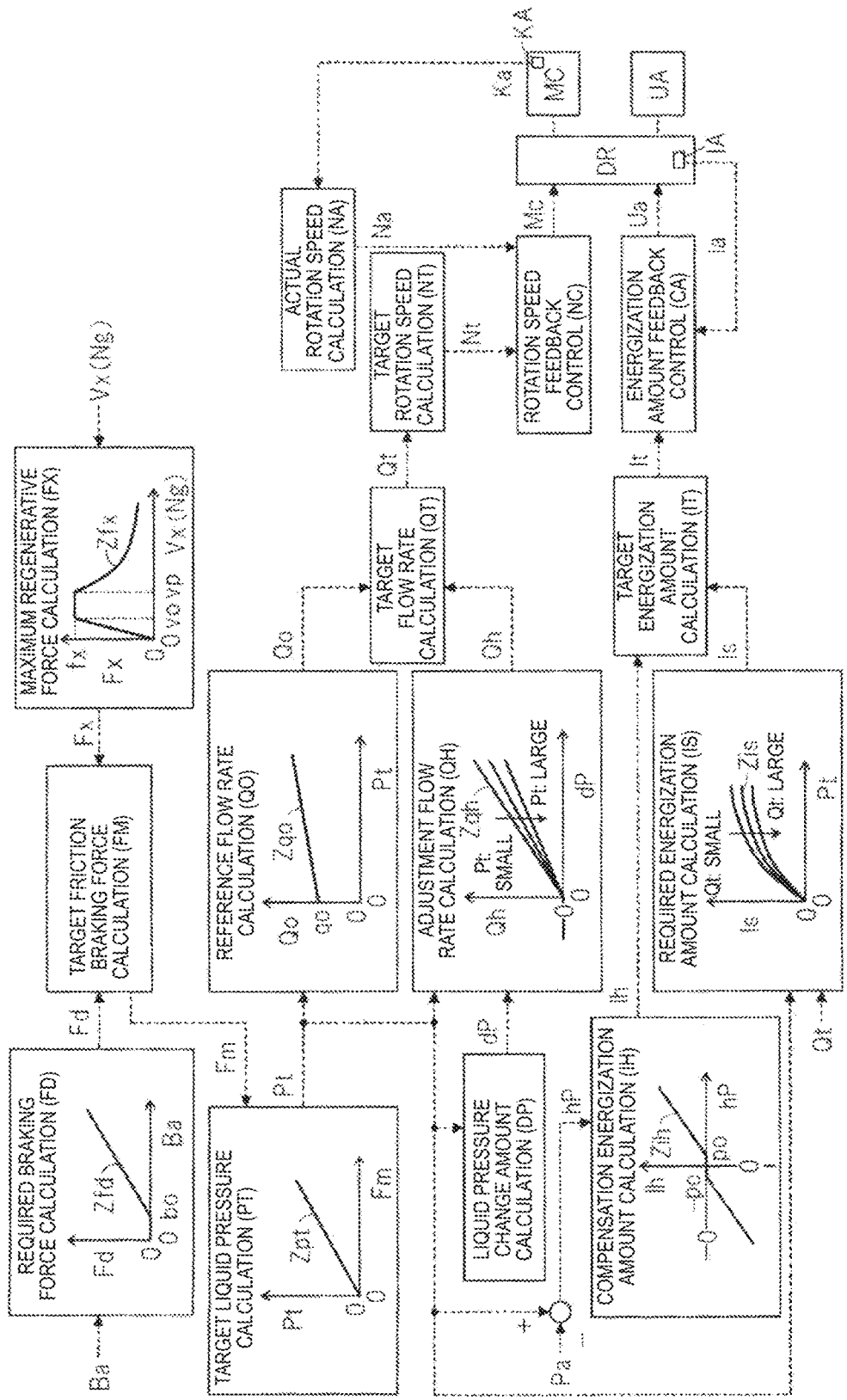
FIG. 2 is a functional block diagram for illustrating a first processing example of pressure adjustment control corresponding to the first embodiment.

A first processing example of pressure adjustment control corresponding to the first embodiment will be described with reference to a functional block diagram of FIG. 2. The pressure adjustment control is drive control of the electric motor MC and the pressure adjustment valve UA for controlling the adjustment hydraulic pressure Pa. An algorithm of the control is programmed in the upper portion controller ECU.

Pressure adjustment control processing includes a required braking force calculation block FD, a maximum regenerative force calculation block FX, a target friction braking force calculation block FM, a target hydraulic pressure calculation block PT, a reference flow rate calculation block QO, a hydraulic pressure change amount calculation block DP, an adjustment flow rate calculation block QH, a target flow rate calculation block QT, a target rotation speed calculation block NT, an actual rotation speed calculation block NA, a rotation speed feedback control block NC, a required energization amount calculation block IS, a compensation energization amount calculation block IH, a target energization amount calculation block IT, and an energization amount feedback control block CA.

In the required braking force calculation block FD, a required braking force Fd is calculated based on the operation amount Ba and a calculation map Zfd. The required braking force Fd is a target value of a total braking force F acting on the vehicle, and is a braking force obtained by combining "a friction braking force Fm by the brake control device SC" with "a regenerative braking force Fg by the generator GN". The required braking force Fd is determined to be "0" in a range where the operation amount Ba is between "0" and a predetermined value bo according to the calculation map Zfd, and is calculated to monotonically increase from "0" as the operation amount Ba increases when the operation amount Ba is equal to or greater than the predetermined value bo.

In the maximum regenerative force calculation block FX, a maximum value of the regenerative braking force (referred to as the "maximum regenerative force") Fx is calculated based on the vehicle body speed Vx and a calculation map Zfx. A regeneration amount of the generator GN is limited by rating of a power transistor (such as IGBT) of the drive controller ECD and charge acceptability of a battery. For example, the regeneration amount of the generator GN is controlled to be a predetermined electric power (electric energy per unit time). Since the electric power (power) is constant, regenerative torque of the generator GN around a wheel axle is inversely proportional to a rotation speed of the wheel WH (that is, the vehicle body speed Vx). In addition, when a rotation speed Ng of the generator GN decreases, the regeneration amount decreases. Further, the regeneration amount is provided with an upper limit value.

In the calculation map Zfx for the maximum regenerative force Fx, the maximum regenerative force Fx is set to increase in accordance with an increase in the vehicle body speed Vx which is in a range equal to or greater than "0" and less than a first predetermined speed vo. In a range where the vehicle body speed Vx is equal to or greater than the first predetermined speed vo and less than a second predetermined speed vp, the maximum regenerative force Fx is determined to be an upper limit value fx. When the vehicle body speed Vx is equal to or greater than the second predetermined speed vp, the maximum regenerative force Fx is set to decrease as the vehicle body speed Vx increases. For example, in a decrease characteristic of the maximum regenerative force Fx (a characteristic of "Vx≥vp"), a relationship between the vehicle body speed Vx and the maximum regenerative force Fx is represented by a hyperbola (that is, a regenerative electric power is constant). Here, each of the predetermined values vo and vp is a preset constant. In the calculation map Zfx, the rotation speed Ng of the generator GN may be employed instead of the vehicle body speed Vx.

In the target friction braking force calculation block FM, the target friction braking force Fm is calculated based on the required braking force Fd and the maximum regenerative force Fx. The target friction braking force Fm is a target value of a braking force to be achieved by friction braking. In the target friction braking force calculation block FM, it is determined "whether the required braking force Fd is equal to or less than the maximum regenerative force Fx". That is, it is determined whether the braking force Fd required by a driver can be achieved only by the regenerative braking force Fg. In a case where "Fd≤Fx", the required braking force Fd is determined as the regenerative braking force Fg, and the target friction braking force Fm is determined to be "0" (that is, "Fg=Fd, Fm=0"). In this case, friction braking is not employed for vehicle deceleration, and the required braking force Fd is achieved only by regenerative braking. On the other hand, in a case where "Fd>Fx", the regenerative braking force Fg is determined to be the maximum regenerative force Fx, and the target friction braking force Fm is determined by subtracting the maximum regenerative force Fx from the required braking force Fd (that is, "Fg=Fx, Fm=Fd−Fx"). That is, a shortage of the regenerative braking force Fg (=Fx) in the required braking force Fd is supplemented by the target friction braking force Fm. In addition, in the target friction braking force calculation block FM, the regeneration amount Rg is calculated based on the regenerative braking force Fg. The regeneration amount Rg is a target value of the regeneration amount of the generator GN. The regeneration amount Rg is transmitted from the upper portion controller ECU to the drive controller ECD via the communication bus BS.

In the target hydraulic pressure calculation block PT, a target hydraulic pressure Pt is calculated based on the target friction braking force Fm and a calculation map Zpt. The target hydraulic pressure Pt is a target value of the adjustment hydraulic pressure Pa adjusted by the pressure adjustment unit YA. The target hydraulic pressure Pt is determined to monotonically increase from "0" as the target friction braking force Fm increases from "0" in accordance with the calculation map Zpt. That is, the target friction braking force Fm is converted into the hydraulic pressure to determine the target hydraulic pressure Pt.

In the reference flow rate calculation block QO, a reference flow rate Qo is calculated based on the target hydraulic pressure Pt and a calculation map Zqo. The reference flow rate Qo is a target value of a discharge amount (flow rate) of the electric pump DC (that is, the fluid pump HP) that is minimally required to adjust the hydraulic pressure by the orifice effect of the pressure adjustment valve UA. The reference flow rate Qo is determined so as to monotonically increase from a predetermined flow rate qo as the target hydraulic pressure Pt increases from "0" in accordance with the calculation map Zqo. This is based on the fact that internal leakage of the fluid pump HP increases as the hydraulic pressure increases. The predetermined flow rate qo is a preset constant.

In the hydraulic pressure change amount calculation block DP, a hydraulic pressure change amount dP is calculated based on the target hydraulic pressure Pt. The hydraulic pressure change amount dP is state quantity corresponding to an operation speed dB of the brake operation member BP (referred to as "operation speed equivalent amount"). Specifically, the target hydraulic pressure Pt is time-differentiated to determine the hydraulic pressure change amount dP. The hydraulic pressure change amount dP is calculated so as to increase as the operation speed dB (a time change amount of the operation amount Ba) of the brake operation member BP increases.

In the adjustment flow rate calculation block QH, an adjustment flow rate Qh is calculated based on the hydraulic pressure change amount dP, the target hydraulic pressure Pt, and a calculation map Zqh. The adjustment flow rate Qh is a target value of a discharge flow rate of the electric pump DC which is necessary for increasing the adjustment hydraulic pressure Pa. The adjustment flow rate Qh is calculated to be "0" when the hydraulic pressure change amount dP is equal to or less than "0" in accordance with the calculation map Zqh, and is determined so as to monotonically increase from "0" as the hydraulic pressure change amount dP increases from "0". The adjustment flow rate Qh is determined to be larger as the hydraulic pressure change amount dP increases such that a large amount of brake liquid BF is supplied to the wheel cylinder CW. That is, when the brake operation member BP is held (that is, "dP=0") or when the brake operation member BP is returned (that is, "dP<0"), "Qh=0" is determined.

In addition, the adjustment flow rate Qh is determined, according to the calculation map Zqh, to be larger as the target hydraulic pressure Pt decreases, and is determined to be smaller as the target hydraulic pressure Pt increases. This is because the adjustment hydraulic pressure Pa (as a result, brake hydraulic pressure Pw) increases according to rigidity (non-linear spring constant) of the brake caliper, friction material, and the like. That is, a large amount of flow rate is required when the adjustment hydraulic pressure Pa is low, while the flow rate is not so required when the adjustment hydraulic pressure Pa is high. Therefore, the adjustment flow rate Qh is determined to be larger as the target hydraulic pressure Pt decreases.

In the target flow rate calculation block QT, a target flow rate Qt is calculated based on the reference flow rate Qo and the adjustment flow rate Qh. The target flow rate Qt is a target value of a discharge flow rate of the electric pump DC (that is, the fluid pump HP). Specifically, the target flow rate Qt is determined by adding up the reference flow rate Qo and the adjustment flow rate Qh (that is, "Qt=Qo+Qh"). In the target rotation speed calculation block NT, a target rotation speed Nt is calculated based on the target flow rate Qt. The target rotation speed Nt is a target value of a rotation speed of the electric pump DC (in particular, the electric motor MC). Since a discharge amount per rotation of the fluid pump HP is known, the target flow rate Qt is converted into the target rotation speed Nt. In the actual rotation speed calculation block NA, an actual rotation speed Na is calculated based on an actual rotation angle Ka (detected value of a rotation angle sensor KA). Specifically, the actual rotation angle Ka is time-differentiated to determine the actual rotation speed Na.

In the rotation speed feedback control block NC, rotation speed feedback control of the electric motor MC is executed based on the target rotation speed Nt and the actual rotation speed Na. That is, the drive signal Mc is determined such that the actual rotation speed Na approaches and matches the target rotation speed Nt. The switching element of the drive circuit DR is driven based on the drive signal Mc, and the electric motor MC is controlled.

The hydraulic pressure change amount dP (operation speed equivalent amount) corresponds to an operation of the brake operation member BP. When the brake operation amount Ba is increased and the adjustment hydraulic pressure Pa is required to be increased, the hydraulic pressure change amount dP is greater than "0" (that is, "dP>0"). When the brake operation member BP is held (that is, "Ba=0"), the hydraulic pressure change amount dP is "0" (that is, "dP=0"). In addition, when the operation amount Ba is decreased, the hydraulic pressure change amount dP is smaller than "0" (that is, "dP<0").

When the hydraulic pressure change amount dP is larger than "0", the adjustment flow rate Qh is calculated to be larger than "0". The adjustment flow rate Qh is determined to be larger as the hydraulic pressure change amount dP increases (as an increase gradient of the adjustment hydraulic pressure Pa increases). As a result, when "dP>0", the target rotation speed Nt increases as the hydraulic pressure change amount dP increases. Meanwhile, when the adjustment hydraulic pressure Pa is maintained constant, the reference flow rate Qo is sufficient for a flow rate of the brake liquid BF (discharge flow rate of the electric pump DC). The same also applies to a case where the adjustment hydraulic pressure Pa decreases. Therefore, when the hydraulic pressure change amount dP is equal to or less than "0", the adjustment flow rate Qh is calculated to be "0". Therefore, when the operation of the brake operation member BP is held or decreased after increasing, the increased target rotation speed Nt is decreased.

The hydraulic pressure change amount dP corresponding to the operation of the brake operation member BP is calculated, the rotation speed of the electric pump DC (in particular, the electric motor MC) is determined, and the electric pump DC (in particular, the fluid pump HP) does not discharge any unnecessary flow rate, so that the brake control device SC can be power saving. Further, when a rapid increase in the brake hydraulic pressure Pw is required (for example, when the brake operation member BP is suddenly operated), the rotation speed Na of the electric motor MC is rapidly increased, and a sufficient amount of liquid (volume of the brake liquid BF) is supplied to the wheel cylinder CW. Therefore, pressure-rise responsiveness of the brake hydraulic pressure Pw is improved, time delay in feedback control based on a deviation hP is reduced, and thus pressure adjustment accuracy of the brake hydraulic pressure Pw is ensured.

In the above description, the adjustment flow rate Qh is calculated based on the hydraulic pressure change amount dP. However, since the target hydraulic pressure Pt is calculated in accordance with the operation amount Ba or the target friction braking force Fm, the adjustment flow rate Qh can be calculated based on a time differential value (operation speed) dB of the operation amount Ba or a time differential value (braking force change amount) dF of the target friction braking force Fm. That is, at least one of the hydraulic pressure change amount dP, the operation speed dB, and the friction braking force change amount dF corresponds to the "operation speed equivalent amount". The operation speed equivalent amount is state quantity representing an increase or decrease in the operation amount Ba of the brake operation member BP. That is, "a case where the operation speed equivalent amount is larger than zero" indicates an increase in the operation, "a case where the operation speed equivalent amount is zero" indicates holding of the operation, and "a case where the operation speed equivalent amount is smaller than zero" indicates a decrease in the operation.

In the required energization amount calculation block IS, a required energization amount Is is calculated based on the target hydraulic pressure Pt, the target flow rate Qt, and a calculation map Zis. The required energization amount Is is a target value of an energization amount (current) supplied to the pressure adjustment valve UA. The required energization amount Is is determined to monotonically increase from "0" according to an "upward protruding" characteristic as the target hydraulic pressure Pt increases from "0" in accordance with the calculation map Zis. In addition, the required energization amount Is is determined, according to the calculation map Zis, to be larger as the target flow rate Qt decreases, and is determined to be smaller as the target flow rate Qt increases. Since the pressure adjustment valve UA is normally-opened, the required energization amount Is is calculated to be smaller as the target flow rate Qt increases, and the valve opening amount of the pressure adjustment valve UA is increased.

In the compensation energization amount calculation block IH, a compensation energization amount Ih is calculated based on the deviation hP between the target hydraulic pressure Pt and the adjustment hydraulic pressure Pa and a calculation map Zih. The compensation energization amount Ih is a target value of an energization amount (current) supplied to the pressure adjustment valve UA to cause the adjustment hydraulic pressure Pa to match the target hydraulic pressure Pt. First, the adjustment hydraulic pressure Pa (detected value of the adjustment hydraulic pressure sensor PA) is subtracted from the target hydraulic pressure Pt to calculate the hydraulic pressure deviation hP (that is, "hP=Pt−Pa"). When the deviation hP is equal to or less than a predetermined value "−po" and the deviation hP is equal to or greater than a predetermined value po, the compensation energization amount Ih is determined to increase as the hydraulic pressure deviation hP increases. In addition, in a range where the hydraulic pressure deviation hP is between the predetermined value "−po" and the predetermined value po, the compensation energization amount Ih is determined to be "0". Here, the predetermined value po is a preset positive constant.

In the target energization amount calculation block IT, a target energization amount It is calculated based on the required energization amount Is and the compensation energization amount Ih. The target energization amount It is a final target value of the energization amount (current) supplied to the pressure adjustment valve UA. Specifically, the required energization amount Is and the compensation energization amount Ih are added together to calculate the target energization amount It (that is, "It=Is+Ih").

In the energization amount feedback control block CA, energization amount feedback control of the pressure adjustment valve UA is executed based on the target energization amount It and an actual energization amount Ia. That is, the drive signal Ua is determined such that the actual energization amount Ia approaches and matches the target energization amount It. Here, the actual energization amount Ia is detected by an energization amount sensor IA provided in the drive circuit DR. The drive circuit DR is driven based on the drive signal Ua, and the pressure adjustment valve UA is controlled. As a result, the adjustment hydraulic pressure Pa is controlled to approach and match the target hydraulic pressure Pt.

In the above description, when the hydraulic pressure change amount dP (operation speed equivalent amount) is equal to or less than "0" (that is, when the brake operation member BP is held or returned), the target flow rate Qt is determined to be the reference flow rate Qo. Since the pressure adjustment unit YA is provided with the check valve GC, when the pressure adjustment valve UA is completely closed, the adjustment hydraulic pressure Pa can be kept constant. In addition, when the pressure adjustment valve UA is slightly opened, the adjustment hydraulic pressure Pa can be gradually decreased. Therefore, in a case where "dP≤0", "Qo=0" is determined, and the target flow rate Qt is determined to be "0". As a result, rotation of the electric pump DC (=MC) is stopped (that is, "Nt=0"). When the brake operation member BP is held or returned, the electric motor MC is stopped, so that power saving is further achieved. When the brake hydraulic pressure Pw is increased from the state where the electric motor MC is stopped, the target flow rate Qt is determined to be the adjustment flow rate Qh (that is, "Qt=Qh").

<Second Embodiment of Brake Control Device SC>

Figure 3:
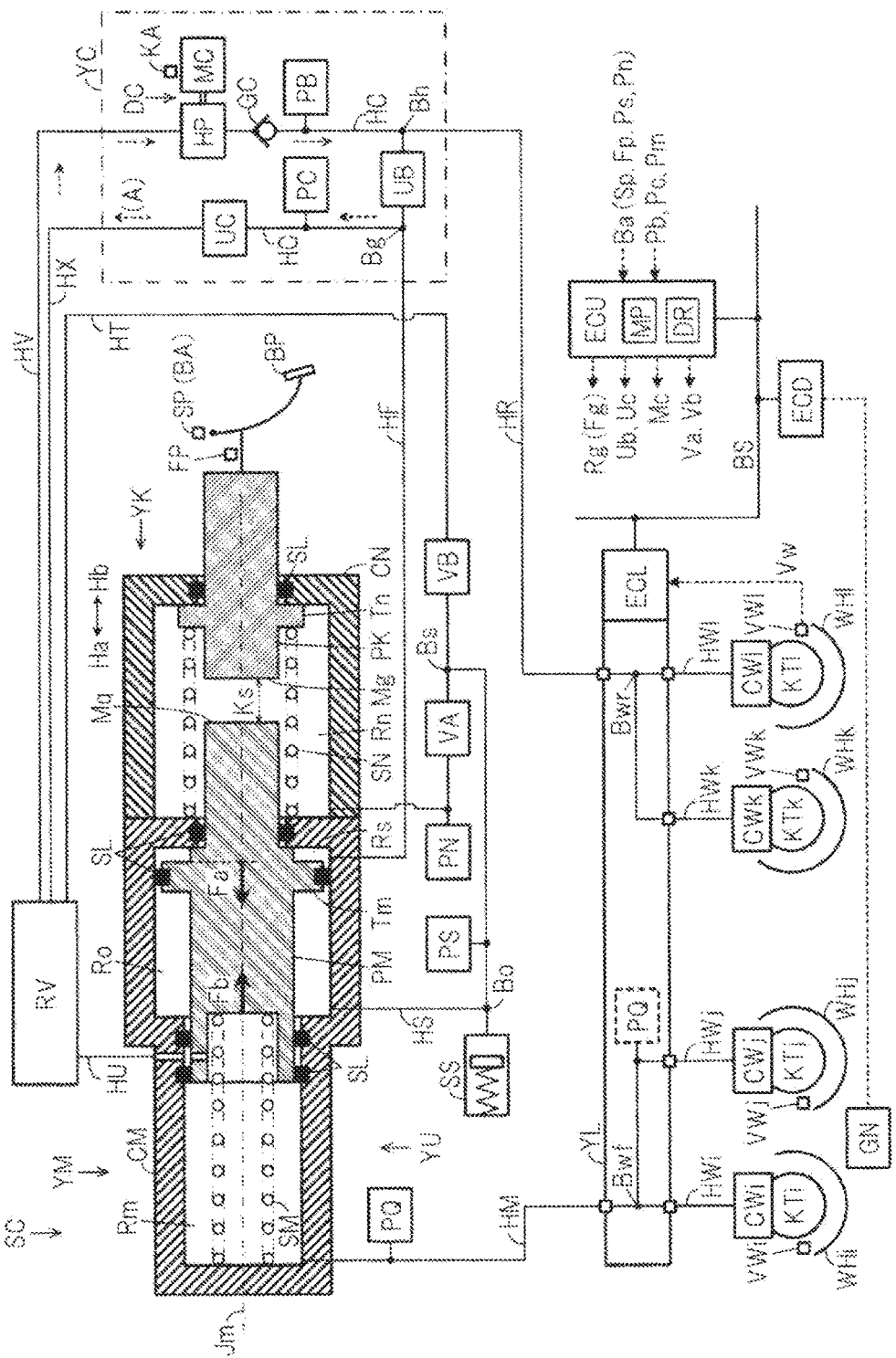
FIG. 3 is an overall configuration diagram for illustrating a second embodiment of the brake control device SC for a vehicle according to the disclosure.

A second embodiment of the brake control device SC according to the disclosure will be described with reference to an overall configuration diagram of FIG. 3. In the second embodiment, a so-called front and rear type fluid path is employed as a two-system fluid path. In the first embodiment, the adjustment hydraulic pressure Pa is supplied to the four wheel cylinders CWs to perform the equivalent pressure adjustment. However, in the second embodiment, the front wheel wheel cylinder CWf and the rear wheel wheel cylinder CWr are individually controlled. This control is referred to as "independent pressure adjustment".

Similar to the above, components, calculation processes, signals, characteristics, and values having the same symbols have the same functions. Subscripts "i" to "l" appended to ends of symbols relating to wheels are comprehensive symbols indicating which wheel each of the symbols is related to. Specifically, "i" denotes a right front wheel, "j" denotes a left front wheel, "k" denotes a right rear wheel, and "l" denotes a left rear wheel. The subscripts "i" to "l" at the ends of the symbols may be omitted. In this case, each symbol represents a general term for each of the four wheels. Subscripts "f" and "r" appended to ends of symbols relating to a front and rear type braking system are comprehensive symbols indicating which system of front and rear wheels each of the symbols is related to. "f" indicates a front wheel system and "r" indicates a rear wheel system. In addition, subscripts "1" and "2" appended to ends of symbols relating to diagonal type braking systems are comprehensive symbols indicating which system each of the symbols is related to. "1" indicates a first system, and "2" indicates a second system. The subscripts "f", "r", "1", and "2" at the ends of the symbols may be omitted. In this case, each symbol represents a general term for each of the two braking systems. In addition, a side away from the wheel cylinder CW is referred to as an "upper portion", and a side close to the wheel cylinder CW is referred to as a "lower portion". In the recirculation path (A), a side closer to the discharge portion of the fluid pump HP is referred to as an "upstream side", and a side farther therefrom is referred to as a "downstream side".

<<Brake Control Device SC>>

The brake control device SC according to the second embodiment includes an upper portion fluid unit YU. The upper portion fluid unit YU is controlled by the upper portion controller ECU. As in the first embodiment, in the second embodiment, the lower portion fluid unit YL controlled by the lower portion controller ECL is also provided in the vehicle. The upper portion controller ECU and the lower portion controller ECL are connected via the communication bus BS such that signals (such as sensor detected values and calculation values) are shared.

In the second embodiment, the generator GN is also provided in the front wheel WHf. The upper portion fluid unit YU in the second embodiment includes the operation amount sensor BA, a master unit YM, a pressure adjustment unit YC, and a regeneration cooperation unit YK.

The operation amount sensor BA is provided to detect an operation amount Ba of the brake operation member (brake pedal) BP operated by the driver. The operation displacement sensor SP that detects the operation displacement Sp of the brake operation member BP is provided as the operation amount sensor BA. The operation force sensor FP is provided to detect the operation force Fp of the brake operation member BP. A simulator hydraulic pressure sensor PS is provided as the operation amount sensor BA so as to detect a hydraulic pressure (simulator hydraulic pressure) Ps in the stroke simulator SS. An input hydraulic pressure sensor PN is provided to detect a hydraulic pressure (input hydraulic pressure) Pn in an input chamber Rn of the regeneration cooperation unit YK. The operation amount sensor BA is a general term for the above-mentioned operation displacement sensor SP and the like, and at least one of the operation displacement Sp, the operation force Fp, the simulator hydraulic pressure Ps, and the input hydraulic pressure Pn is adopted as the brake operation amount Ba. The detected brake operation amount Ba is input to the upper portion controller ECU. It should be noted that the master cylinder hydraulic pressure Pm does not correspond to the operation amount Ba in the second embodiment.

[Master Unit YM]

The master unit YM adjusts a hydraulic pressure (front wheel brake hydraulic pressure) Pwf in the front wheel wheel cylinder CWf via the master cylinder chamber Rm. The master unit YM includes the master cylinder CM, a master piston PM, and a master elastic body SM.

The master cylinder CM is a stepped cylinder member (that is, including a small diameter portion and a large diameter portion) including a bottom portion. A single type master cylinder CM is employed as the master cylinder CM. The master piston PM is a piston member inserted into the master cylinder CM, and includes a flange portion (flange) Tm. The master cylinder CM and the master piston PM are sealed by a seal SL. The master piston PM can move in conjunction with an operation of the brake operation member BP. An interior of the master cylinder CM is partitioned by the master piston PM into three hydraulic pressure chambers Rm, Rs, and Ro. The master piston PM can move smoothly along a central axis Jm of the master cylinder CM.

The master cylinder chamber (also simply referred to as a "master chamber") Rm is a hydraulic pressure chamber partitioned by "a small diameter inner peripheral portion and a small diameter bottom portion of the master cylinder CM", and an end portion of the master piston PM. The master cylinder fluid path HM is connected to the master chamber Rm, and is finally connected to the front wheel wheel cylinder CWf (=CWi, CWj) via the lower portion fluid unit YL.

The interior of the master cylinder CM is partitioned into the servo hydraulic pressure chamber (also simply referred to as a "servo chamber") Rs and the reaction force hydraulic pressure chamber (also simply referred to as a "reaction force chamber") Ro by the flange portion Tm of the master piston PM. The servo chamber Rs is a hydraulic pressure chamber partitioned by "a large diameter inner peripheral portion and a large diameter bottom portion of the master cylinder CM", and the flange portion Tm of the master piston PM. The master chamber Rm and the servo chamber Rs are disposed to face each other with the flange portion Tm interposed therebetween. A front wheel pressure adjustment fluid path HF is connected to the servo chamber Rs, and an adjustment hydraulic pressure Pc is introduced from the pressure adjustment unit YC.

The reaction force chamber Ro is a hydraulic pressure chamber partitioned by the large diameter inner peripheral portion and a stepped portion of the master cylinder CM, and the flange portion Tm of the master piston PM. The reaction force chamber Ro is sandwiched by the master hydraulic pressure chamber Rm and the servo hydraulic pressure chamber Rs in a direction of the central axis Jm, and is located therebetween. Therefore, when a volume of the servo chamber Rs is increased, a volume of the reaction force chamber Ro is reduced. Conversely, when the servo chamber volume is reduced, the reaction force chamber volume is increased. A simulator fluid path HS is connected to the reaction force chamber Ro. A liquid amount of the brake liquid BF in the upper portion fluid unit YU is adjusted by the reaction force chamber Ro.

The master elastic body (for example, a compression spring) SM is provided between the end portion of the master piston PM and the small diameter bottom portion of the master cylinder CM. The master elastic body SM presses the master piston PM against the large diameter bottom portion of the master cylinder CM in the direction of the central axis Jm of the master cylinder CM. When not braking, the master piston PM abuts against the large diameter bottom portion of the master cylinder CM. A position of the master piston PM in this state is referred to as an "initial position of the master unit YM".

A through hole is provided in the master cylinder CM, and is connected to the reservoir RV through a supply fluid path HU. When the master piston PM is in the initial position, the master chamber Rm is in communication with the reservoir RV through the through hole and the supply fluid path HU.

The master chamber Rm applies an urging force Fb in a backward direction Hb (referred to as a "retracting force") along the central axis Jm to the master piston PM by an internal pressure thereof ("master cylinder hydraulic pressure", also referred to as "master hydraulic pressure") Pm. The servo chamber Rs applies an urging force Fa in a forward direction Ha (referred to as an "advancing force") that faces the retracting force Fb to the master piston PM by an internal pressure thereof (that is, the introduced adjustment hydraulic pressure Pc). That is, in the master piston PM, the advancing force Fa applied by the hydraulic pressure Pc in the servo chamber Rs and the retracting force Fb applied by the hydraulic pressure (master hydraulic pressure) Pm in the master chamber Rm oppose each other (face each other) in the direction of the central axis Jm and are statically balanced. The master cylinder hydraulic pressure sensor PQ is provided to detect the master hydraulic pressure Pm. For example, the master cylinder hydraulic pressure sensor PQ may be provided in the master cylinder fluid path HM. In addition, the master cylinder hydraulic pressure sensor PQ may also be provided in the lower portion fluid unit YL.

[Pressure Adjustment Unit YC]

The pressure adjustment unit YC includes the electric pump DC, the check valve GC, first and second pressure adjustment valves UB and UC, and first and second adjustment hydraulic pressure sensors PB and PC. The hydraulic pressure (front wheel brake hydraulic pressure) Pwf of the front wheel wheel cylinder CWf and a hydraulic pressure (rear wheel brake hydraulic pressure) Pwr of the rear wheel wheel cylinder CWr are independently and individually adjusted by the pressure adjustment unit YC (that is, the independent pressure adjustment described above). Specifically, the brake hydraulic pressure Pwf of the front wheel WHf where the generator GN is provided is independently adjusted within a range equal to or less than the brake hydraulic pressure Pwr of the rear wheel WHr where the generator GN is not provided.

The electric pump DC includes the electric motor MC and the fluid pump HP which rotate integrally. In the fluid pump HP, the absorption port is connected to the first reservoir fluid path HV, and the discharge port is connected to one end portion of the pressure adjustment fluid path HC. The pressure adjustment fluid path HC is provided with the check valve GC. The other end portion of the pressure adjustment fluid path HC is connected to the second reservoir fluid path HX via the second pressure adjustment valve UC. The first and second reservoir fluid paths HV and HX are connected to the reservoir RV.

The two pressure adjustment valves UB and UC are provided in series in the pressure adjustment fluid path HC. Specifically, the first pressure adjustment valve UB is provided in the pressure adjustment fluid path HC, and the second pressure adjustment valve UC is provided at the other end portion of the pressure adjustment fluid path HC. An end portion of the second reservoir fluid path HX is connected to the second pressure adjustment valve UC. That is, in the recirculation path (A), the first pressure adjustment valve UB is disposed on the upstream side and the second pressure adjustment valve UC is disposed on the downstream side. Similar to the pressure adjustment valve UA, the first and second pressure adjustment valves UB and UC are linear solenoid valves (proportional valve, differential pressure valve) in which a valve opening amount (lift amount) is continuously controlled based on an energization state (for example, supply current). The first and second pressure adjustment valves UB and UC are controlled by the controller ECU based on drive signals Ub and Uc. Normally-opened solenoid valves are employed as the first and second pressure adjustment valves UB and UC.

When the electric pump DC is driven, the recirculation (A) of the brake liquid BF is formed as "HV to HP to GC to UB to UC to HX to RV to HV". That is, the fluid pump HP, the first and second pressure adjustment valves UB and UC, and the reservoir RV are provided in the recirculation path (A) of the brake liquid BF. As described in the first embodiment, the second pressure adjustment valve UC may also be connected to the first reservoir fluid path HV. In this case, the recirculation path (A) is in an order of "HV to HP to GC to UB to UC to HV".

When the first and second pressure adjustment valves UB and UC are in a fully open state (when not energized, since the first and second pressure adjustment valves UB and UC are normally-opened), the hydraulic pressures (adjustment hydraulic pressures) Pb and Pc in the pressure adjustment fluid path HC are approximately "0 (atmospheric pressure)". When the energization amount to the first pressure adjustment valve UB on the upstream side is increased and the recirculation (A) is narrowed by the pressure adjustment valve UB, a hydraulic pressure on the upstream side of the first pressure adjustment valve UB in the pressure adjustment fluid path HC (for example, the hydraulic pressure (first adjustment hydraulic pressure) Pb between the fluid pump HP and the first pressure adjustment valve UB) is increased from "0". In addition, when the energization amount to the second pressure adjustment valve UC on the downstream side is increased and the recirculation (A) is narrowed by the pressure adjustment valve UC, a hydraulic pressure on the upstream side of the second pressure adjustment valve UC in the pressure adjustment fluid path HC (for example, the hydraulic pressure (second adjustment hydraulic pressure) Pc between the first pressure adjustment valve UB and the second pressure adjustment valve UC) is increased from "0".

Since the first and second pressure adjustment valves UB and UC are disposed in series with respect to the pressure adjustment fluid path HC, the second adjustment hydraulic pressure Pc adjusted by the second pressure adjustment valve UC is equal to or less than the first adjustment hydraulic pressure Pb. The first pressure adjustment valve UB adjusts the first adjustment hydraulic pressure Pb, and the second pressure adjustment valve UC adjusts the second adjustment hydraulic pressure Pc by reducing the second adjustment hydraulic pressure Pc from the first adjustment hydraulic pressure Pb. In other words, the second adjustment hydraulic pressure Pc is adjusted by the second pressure adjustment valve UC to increase from "0 (atmospheric pressure)", and the first adjustment hydraulic pressure Pb is adjusted by the first pressure adjustment valve UB to increase from the second adjustment hydraulic pressure Pc. The first and second adjustment hydraulic pressure sensors PB and PC are provided in the pressure adjustment unit YC so as to detect the first and second adjustment hydraulic pressures Pb and Pc. Since specifications of the master unit YM (such as a pressure receiving area of the master piston PM) are known, the mass cylinder hydraulic pressure sensor PQ may be used instead of the second adjustment hydraulic pressure sensor PC. That is, the second adjustment hydraulic pressure sensor PC can be omitted.

The pressure adjustment fluid path HC is branched into a rear wheel pressure adjustment fluid path HR at a portion Bh between the fluid pump HP and the first pressure adjustment valve UB. The rear wheel pressure adjustment fluid path HR is connected to the rear wheel wheel cylinder CWr via the lower portion fluid unit YL. Therefore, the first adjustment hydraulic pressure Pb is directly introduced (supplied) to the rear wheel wheel cylinder CWr. In addition, the pressure adjustment fluid path HC is branched into a front wheel pressure adjustment fluid path HF at a portion Bg between the first pressure adjustment valve UB and the second pressure adjustment valve UC. The front wheel pressure adjustment fluid path HF is connected to the servo chamber Rs. Therefore, the second adjustment hydraulic pressure Pc is introduced (supplied) to the servo chamber Rs. Since the master cylinder CM is connected to the front wheel wheel cylinder CWf via the lower portion fluid unit YL, the second adjustment hydraulic pressure Pc is indirectly introduced to the front wheel wheel cylinder CWf via the master cylinder CM.

In the second embodiment, the first adjustment hydraulic pressure Pb (the hydraulic pressure between the fluid pump HP and the first pressure adjustment valve UB) and the second adjustment hydraulic pressure Pc (the hydraulic pressure between the first pressure adjustment valve UB and the second pressure adjustment valve UC) are adjusted independently and separately in a range of "Pb Pc". As a result, the regenerative cooperative control is executed while front-rear distribution of the braking force is taken into consideration, so that deceleration and stability of the vehicle can be ensured and regenerative energy can be maximized.

[Regeneration Cooperation Unit YK]

Cooperative control of the friction braking and the regenerative braking (referred to as "regenerative cooperative control") is achieved by the regeneration cooperation unit YK. For example, a state where the brake hydraulic pressure Pw is not generated while the brake operation member BP is operated can be formed by the regeneration cooperation unit YK. The regeneration cooperation unit YK includes an input cylinder CN, an input piston PK, an input elastic body SN, a first on-off valve VA, a second on-off valve VB, the stroke simulator SS, the simulator hydraulic pressure sensor PS, and the input hydraulic pressure sensor PN.

The input cylinder CN is a cylinder member including a bottom portion and fixed to the master cylinder CM. The input piston PK is a piston member inserted into the input cylinder CN. The input piston PK is mechanically connected to the brake operation member BP via a clevis (U-shaped link) so as to be interlocked with the brake operation member BP. The input piston PK is provided with a flange portion (flange) Tn. The input elastic body (for example, a compression spring) SN is provided between a mounting surface, where the input cylinder CN is mounted to the master cylinder CM, and the flange portion Tn of the input piston PK. The input elastic body SN presses the flange portion Tn of the input piston PK against a bottom portion of the input cylinder CN in the direction of the central axis Jm.

When not braking, a stepped portion of the master piston PM abuts against the large diameter bottom portion of the master cylinder CM, and the flange portion Tn of the input piston PK abuts against the bottom portion of the input cylinder CN. When not braking, a gap Ks between an end surface Mq of the master piston PM and an end surface Mg of the input piston PK inside the input cylinder CN is set to a predetermined distance ks (referred to as an "initial gap"). That is, the master piston PM and the input piston PK are separated by the predetermined distance ks when the pistons PM and PK are located at positions (referred to as "initial positions" of the pistons) furthermost in the backward direction Hb (direction opposite to the forward direction Ha) (that is, when not braking). Here, the predetermined distance ks corresponds to a maximum value of the regeneration amount Rg. When the regenerative cooperative control is executed, the gap (also referred to as "separation displacement") Ks is controlled (adjusted) by the adjustment hydraulic pressure Pc.

When the brake operation member BP is depressed from a state of "Ba=0", the input piston PK is moved from the initial position thereof in the forward direction Ha (a direction in which the brake hydraulic pressure Pw increases). At this time, if the adjustment hydraulic pressure Pc stays at "0", the master piston PM stays in the initial position, so that the gap Ks (a distance between the end surface Mg and the end surface Mq) gradually decreases as the input piston PK advances. On the other hand, when the adjustment hydraulic pressure Pc is increased from "0", the master piston PM is moved in the forward direction Ha from the initial position thereof. Therefore, the gap Ks can be adjusted by the adjustment hydraulic pressure Pc independently of the brake operation amount Ba in a range of "0≤Ks≤ks". That is, by adjusting the adjustment hydraulic pressure Pc, the gap Ks between the input piston PK and the master piston PM is adjusted, and the regenerative cooperative control is achieved.

The input chamber Rn of the regeneration cooperation unit YK and the reaction force chamber Ro of the master unit YM are connected by the simulator fluid path HS. The first on-off valve VA is provided in the simulator fluid path HS. The first on-off valve VA is a normally-closed solenoid valve having an open position and a closed position. A third reservoir fluid path HT is connected to a portion Bs between the first on-off valve VA of the simulator fluid path HS and the reaction force chamber Ro. The second on-off valve VB is provided in the third reservoir fluid path HT. The second on-off valve VB is a normally-opened solenoid valve having an open position and a closed position. The first and second on-off valves VA and VB are two-position solenoid valves (ON/OFF valves) having an open position (communication state) and a closed position (cut-off state). The first and second on-off valves VA and VB are controlled by the upper portion controller ECU based on drive signals Va and Vb. When the brake control device SC is activated, energization to the first and second on-off valves VA and VB is started. Then the first on-off valve VA is set to the open position and the second on-off valve VB is set to the closed position.

The simulator SS is connected to the simulator fluid path HS at a portion Bo between the first on-off valve VA and the reaction force chamber Ro. In other words, the input chamber Rn of the regeneration cooperation unit YK is connected to the simulator SS by the simulator fluid path HS. During the regenerative cooperative control, the first on-off valve VA is set to the open position, and the second on-off valve VB is set to the closed position. Since a flow path to the reservoir RV is cut off in the third reservoir fluid path HT by the closed position of the second on-off valve VB, the brake liquid BF is moved from the input chamber Rn of the input cylinder CN into the simulator SS. Since a force for preventing inflow of the brake liquid BF is applied to the piston of the simulator SS by the elastic body, the operation force Fp is generated when the brake operation member BP is operated.

The third reservoir fluid path HT is connected to the reservoir RV. Apart of the third reservoir fluid path HT can be shared with the first and second reservoir fluid paths HV and HX. However, it is desirable that the first and second reservoir fluid paths HV and HX and the third reservoir fluid path HT are separately connected to the reservoir RV. The fluid pump HP absorbs the brake liquid BF from the reservoir RV via the first reservoir fluid path HV. At this time, air bubbles may be mixed in the first reservoir fluid path HV. Therefore, the third reservoir fluid path HT is directly connected to the reservoir RV so as to prevent the air bubbles from mixing into the input cylinder CN and the like.

The simulator hydraulic pressure sensor PS is provided in the simulator fluid path HS between the first on-off valve VA and the reaction force chamber Ro so as to detect the hydraulic pressure (referred to as the "simulator hydraulic pressure") Ps in the simulator SS. In addition, the input hydraulic pressure sensor PN is provided in the simulator fluid path HS between the first on-off valve VA and the input chamber Rn so as to detect the hydraulic pressure (referred to as "input hydraulic pressure") Pn in the input chamber Rn. Each of the simulator hydraulic pressure sensor PS and the input hydraulic pressure sensor PN is provided as one of the above-mentioned brake operation amount sensors BA. The detected hydraulic pressures Ps and Pn are input to the upper portion controller ECU as the brake operation amount Ba. Since "Ps=Pn" when the first and second on-off valves VA and VB are energized, one of the simulator hydraulic pressure sensor PS or the input hydraulic pressure sensor PN can be omitted.

The electric motor MC and the solenoid valves VA, VB, UB, and UC are controlled by the upper portion controller ECU based on the brake operation amount Ba (Sp, Fp, Ps and Pn), the vehicle body speed Vx, and the adjustment hydraulic pressures (detected values) Pb and Pc. Specifically, in the upper portion controller ECU, the drive signals Va, Vb, Ub, and Uc for controlling the various solenoid valves VA, VB, UB, and UC are calculated. The drive signal Mc for controlling the electric motor MC is calculated in the same way. Based on the drive signals Va, Vb, Ub, Uc and Mc, the solenoid valves VA, VB, UB, UC, and the electric motor MC are driven. The master cylinder hydraulic pressure Pm may be employed instead of the second adjustment hydraulic pressure Pc.

<Second Processing Example of Pressure Adjustment Control (Driving Processing of Electric Motor MC)>

Figure 4:
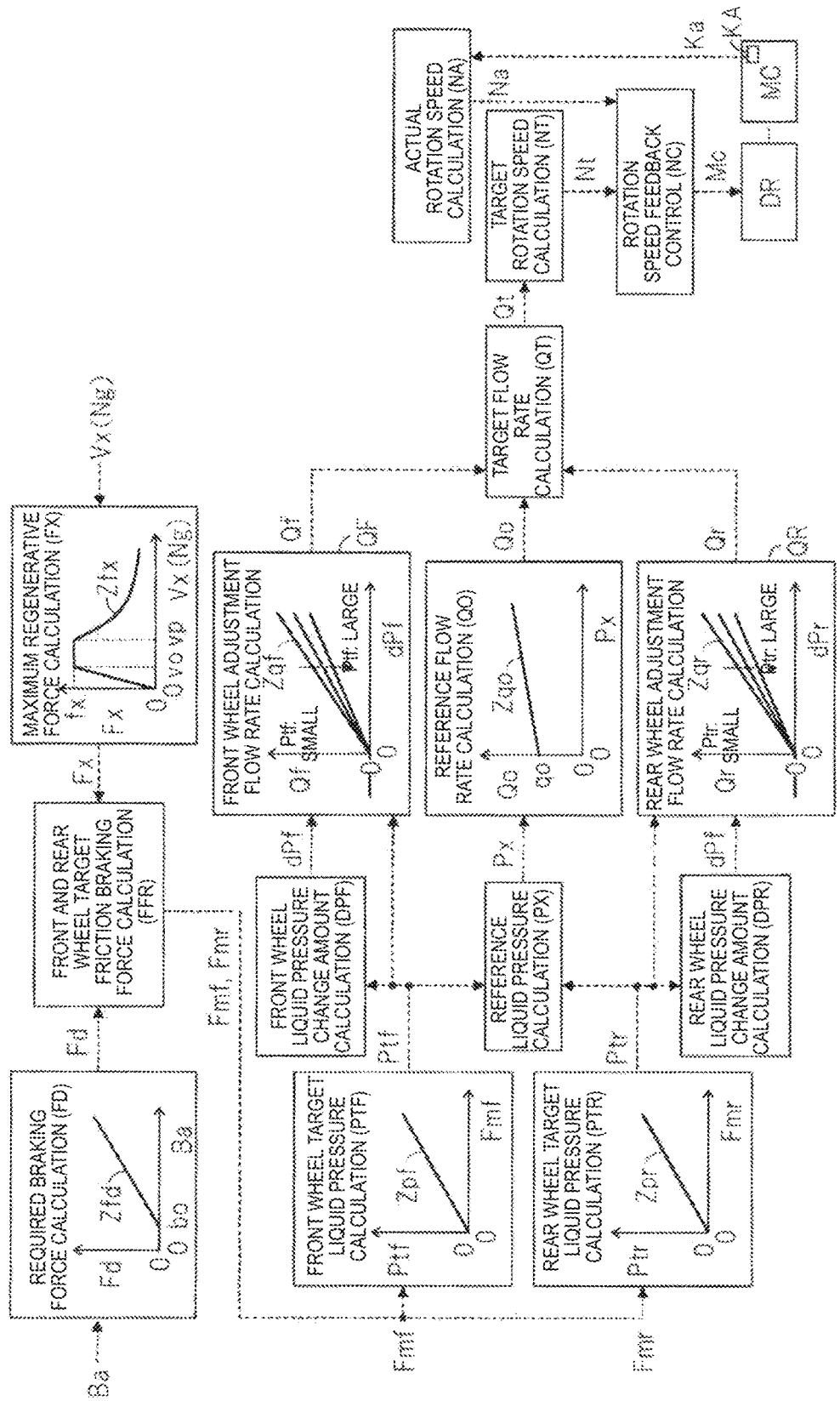
FIG. 4 is a functional block diagram for illustrating a second processing example (in particular, driving processing of an electric motor MC) of pressure adjustment control corresponding to the second embodiment.

A second processing example (in particular, driving processing of the electric motor MC) of pressure adjustment control corresponding to the second embodiment will be described with reference to a functional block diagram of FIG. 4. In the first processing example, all of the four wheel cylinders CWs are subjected to the "equivalent pressure adjustment" in which the same adjustment hydraulic pressure Pa is supplied. The second processing example is the "independent pressure adjustment" in which the hydraulic pressure Pwf of the front wheel wheel cylinder CWf and the hydraulic pressure Pwr of the rear wheel wheel cylinder CWr are controlled individually.

Second pressure adjustment control processing includes the required braking force calculation block FD, the maximum regenerative force calculation block FX, a front and rear wheel target friction braking force calculation block FFR, "front wheel and rear wheel target hydraulic pressure calculation blocks PTF and PTR", "front wheel and rear wheel hydraulic pressure change amount calculation blocks DPF and DPR", a reference hydraulic pressure calculation block PX, the reference flow rate calculation block QO, "front wheel and rear wheel adjustment flow rate calculation blocks QF and QR", the target flow rate calculation block QT, the target rotation speed calculation block NT, the actual rotation speed calculation block NA, and the rotation speed feedback control block NC. The required braking force calculation block FD and the maximum regenerative force calculation block FX are the same as those in the first processing example.

In the required braking force calculation block FD, the required braking force Fd (the target value of the total braking force F) is calculated based on the operation amount Ba and the calculation map Zfd. The required braking force Fd is determined to be "0" in the range where the operation amount Ba is between "0" and the predetermined value bo, and is calculated to monotonically increase from "0" as the operation amount Ba increases when the operation amount Ba is equal to or greater than the predetermined value bo.

In the maximum regenerative force calculation block FX, the maximum regenerative force (generable maximum regenerative braking force) Fx is calculated based on the vehicle body speed Vx (or generator rotation speed Ng) and the calculation map Zfx. In a case where "0≤Vx<vo (predetermined speed)", the maximum regenerative force Fx is calculated to increase as the vehicle body speed Vx increases. In a case where "vo≤Vx<vp (predetermined speed)", the maximum regenerative force Fx is determined to be the upper limit value fx. In a case where "Vx≤vp", the maximum regenerative force Fx is calculated to decrease as the vehicle body speed Vx increases.

In the front and rear wheel target friction braking force calculation block FFR, front wheel and rear wheel target friction braking forces Fmf and Fmr are calculated based on the required braking force Fd and the maximum regenerative force Fx. The front wheel and rear wheel target friction braking forces Fmf and Fmr are target values of target friction braking forces Fmf and Fmr of the front and rear wheels. First, in the front and rear wheel target friction braking force calculation block FFR, a braking force distribution ratio (in particular, a ratio of a rear wheel braking force to the total braking force F, which is referred to as "rear wheel ratio Hr") is set. For example, the rear wheel ratio Hr can be determined as a preset constant (predetermined value) hr. In addition, the rear wheel ratio Hr can be determined based on at least one of turning state quantity Ta, the vehicle body speed Vx, and the required braking force Fd. Here, the turning state quantity Ta is a variable representing a turning state of the vehicle, and corresponds to, for example, yaw rate and lateral acceleration.

Next, in the front and rear wheel target friction braking force calculation block FFR, it is determined "whether the required braking force Fd is equal to or less than the maximum regenerative force Fx" based on the required braking force Fd and the maximum regenerative force Fx. That is, it is determined whether the braking force Fd required by the driver can be achieved only by the regenerative braking force. In a case where "Fd≤Fx", the target regenerative braking force Fg is determined to match the required braking force Fd, and the target friction braking forces Fmf and Fmr of the front and rear wheels are calculated to be "0" (that is, "Fg=Fd, Fmf=Fmr=0"). That is, when the regenerative braking force Fg does not reach the maximum regenerative force Fx (when "Fg<Fx"), friction braking is not employed for vehicle deceleration, and the required braking force Fd is achieved only by regenerative braking.

On the other hand, in a case where "Fd>Fx", the target regenerative braking force Fg, a complementary braking force Fh, and a rear wheel reference force Fs are calculated. The regenerative braking force Fg is calculated based on the maximum regenerative force Fx. Specifically, the regenerative braking force Fg is calculated so as to match the maximum regenerative force Fx. That is, when the regenerative braking force Fg reaches the maximum regenerative force Fx (when "Fg≥Fx"), "Fg=Fx" is calculated, and the regenerative energy is maximized. The rear wheel reference force Fs is calculated based on the required braking force Fd and the rear wheel ratio Hr. The rear wheel reference force Fs is a value which takes a braking force front-rear ratio with respect to the required braking force Fd (that is, the rear wheel ratio Hr) into consideration, and is used as a reference for achieving the rear wheel ratio Hr. Specifically, the rear wheel ratio Hr is multiplied by the required braking force Fd to calculate the rear wheel reference force Fs (that is, "Fs=Hr×Fd"). The complementary braking force Fh is calculated based on the required braking force Fd and the maximum regenerative force Fx. The complementary braking force Fh is a braking force to be complemented by friction braking to achieve the required braking force Fd. Specifically, the maximum regenerative force Fx is subtracted from the required braking force Fd to calculate the complementary braking force Fh (that is, "Fh=Fd−Fx").

Then the complementary braking force Fh and the rear wheel reference force Fs are compared, and it is determined whether "the complementary braking force Fh is equal to or less than the rear wheel reference force Fs". In a case where "Fh≤Fs", the front wheel target friction braking force Fmf is determined to be "0", and the rear wheel target friction braking force Fmr is calculated to match the complementary braking force Fh (that is, "Fmf=0, Fmr=Fh"). That is, when the complementary braking force Fh is equal to or less than the rear wheel reference force Fs, no friction braking force is generated on the front wheel WHf, and only the regenerative braking force Fg is applied. Then a friction braking force is generated on the rear wheel WHr so as to satisfy the required braking force Fd.

On the other hand, in a case where "Fh>Fs", the rear wheel target friction braking force Fmr is calculated to match the rear wheel reference force Fs, and the front wheel target friction braking force Fmf is calculated to match a value (referred to as "front wheel indicating force") Fc obtained by subtracting the rear wheel reference force Fs from the complementary braking force Fh (that is, "Fmf=Fc=Fh−Fs, Fmr=Fs"). When the complementary braking force Fh is greater than the rear wheel reference force Fs, the rear wheel target friction braking force Fmr is set to the rear wheel reference force Fs in consideration of the rear wheel ratio Hr, and insufficient amount thereof with respect to the required braking force Fd (=Fc) is determined as the front wheel target friction braking force Fmf. In the front and rear wheel target friction braking force calculation block FFR, the regeneration amount Rg is calculated based on the regenerative braking force Fg. The regeneration amount Rg is the target value of the regeneration amount of the generator GN. The regeneration amount Rg is transmitted from the upper portion controller ECU to the drive controller ECD via the communication bus BS.

In the front wheel target hydraulic pressure calculation block PTF, a front wheel target hydraulic pressure Ptf is calculated based on the front wheel target friction braking force Fmf and a calculation map Zpf. The front wheel target hydraulic pressure Ptf is a target value of the second adjustment hydraulic pressure Pc adjusted by the pressure adjustment unit YC. The front wheel target hydraulic pressure Ptf is determined to monotonically increase from "0" as the front wheel target friction braking force Fmf increases from "0" in accordance with the calculation map Zpf. In the same way, in the rear wheel target hydraulic pressure calculation block PTR, a rear wheel target hydraulic pressure Ptr is calculated based on the rear wheel target friction braking force Fmr and a calculation map Zpr. The rear wheel target hydraulic pressure Ptr is a target value of the first adjustment hydraulic pressure Pb adjusted by the pressure adjustment unit YC. The rear wheel target hydraulic pressure Ptr is determined to monotonically increase from "0" as the rear wheel target friction braking force Fmr increases from "0" in accordance with the calculation map Zpr.

In the front wheel hydraulic pressure change amount calculation block DPF, a front wheel hydraulic pressure change amount dPf (corresponding to the "operation speed equivalent amount") is calculated based on the front wheel target hydraulic pressure Ptf. Specifically, the front wheel target hydraulic pressure Ptf is time-differentiated to determine the front wheel hydraulic pressure change amount dPf. The front wheel hydraulic pressure change amount dPf is calculated so as to increase as the operation speed dB (the time change amount of the operation amount Ba) of the brake operation member BP increases. In the same way, in the rear wheel hydraulic pressure change amount calculation block DPR, a rear wheel hydraulic pressure change amount dPr (corresponding to the "operation speed equivalent amount") is calculated based on the rear wheel target hydraulic pressure Ptr. That is, the rear wheel target hydraulic pressure Ptr is time-differentiated to determine the rear wheel hydraulic pressure change amount dPr. The rear wheel hydraulic pressure change amount dPr is calculated so as to increase as the operation speed dB (the time change amount of the operation amount Ba) of the brake operation member BP increases.

In the reference hydraulic pressure calculation block PX, the rear wheel target hydraulic pressure Ptr is determined to be a reference hydraulic pressure Px (that is, "Px=Ptr"). Since the first pressure adjustment valve UB is disposed on the upstream side of the second pressure adjustment valve UC, "Ptf>Ptr" is not satisfied. In the reference flow rate calculation block QO, the reference flow rate Qo is calculated based on the reference hydraulic pressure Px and the calculation map Zqo. The reference flow rate Qo is a target value of the discharge amount (flow rate) of the electric pump DC that is minimally required to adjust the hydraulic pressure by the orifice effect of the first and second pressure adjustment valves UB and UC. The reference flow rate Qo is calculated to monotonically increase from the predetermined flow rate qo as the reference hydraulic pressure Px increases from "0" in accordance with the calculation map Zqo so as to compensate for the internal leakage of the fluid pump HP. The predetermined flow rate qo is a preset constant.

In the front wheel adjustment flow rate calculation block QF, a front wheel adjustment flow rate Qf is calculated based on the front wheel hydraulic pressure change amount dPf, the front wheel target hydraulic pressure Ptf, and a calculation map Zqf. The front wheel adjustment flow rate Qf is a target value of the discharge flow rate of the electric pump DC which is necessary for increasing the front wheel brake hydraulic pressure Pwf (=the second adjustment hydraulic pressure Pc). That is, the front wheel adjustment flow rate Qf is a target value of a flow rate (volume per unit time) to be flowed into the front wheel wheel cylinder CWf. The front wheel adjustment flow rate Qf is calculated to be "0" when the front wheel hydraulic pressure change amount dPf is equal to or less than "0" in accordance with the calculation map Zqf, and is determined so as to monotonically increase from "0" as the front wheel hydraulic pressure change amount dPf increases from "0". The front wheel adjustment flow rate Qf is determined to be larger as the front wheel hydraulic pressure change amount dPf increases such that a large amount of brake liquid BF is supplied to the front wheel wheel cylinder CWf. That is, when "dPf=0 (when the brake operation member BP is held)" or "dPf<0 (when the brake operation member BP is returned)", the front wheel adjustment flow rate Qf is set to "0".

In the same way, in the rear wheel adjustment flow rate calculation block QR, a rear wheel adjustment flow rate Qr is calculated based on the rear wheel hydraulic pressure change amount dPr, the rear wheel target hydraulic pressure Ptr, and a calculation map Zqr. The rear wheel adjustment flow rate Qr is a target value of the discharge flow rate of the electric pump DC which is necessary for increasing the rear wheel brake hydraulic pressure Pwr (=the first adjustment hydraulic pressure Pb). That is, the rear wheel adjustment flow rate Qr is a target value of a flow rate (volume per unit time) to be flowed into the rear wheel wheel cylinder CWr. The rear wheel adjustment flow rate Qr is calculated to be "0" when the rear wheel hydraulic pressure change amount dPr is equal to or less than "0" in accordance with the calculation map Zqr, and is determined so as to monotonically increase from "0" as the rear wheel hydraulic pressure change amount dPr increases from "0". When "dPr=0 (when the brake operation member BP is held)" or "dPr<0 (when the brake operation member BP is returned)", the rear wheel adjustment flow rate Qr is set to "0".

In the front wheel and rear wheel adjustment flow rate calculation blocks QF and QR, the front wheel and rear wheel adjustment flow rates Qf and Qr are determined to be larger as the front wheel and rear wheel target hydraulic pressures Ptf and Ptr decrease, and are determined to be smaller as the front wheel and rear wheel target hydraulic pressures Ptf and Ptr increase. This is based on a fact that the front wheel and rear wheel brake hydraulic pressures Pwf and Pwr increase according to the rigidity (non-linear spring constant) of the brake caliper, friction material, and the like. That is, a large amount of flow rate is required when the front wheel and rear wheel brake hydraulic pressures Pwf and Pwr are low, while the flow rate is not so required when the front wheel and rear wheel brake hydraulic pressures Pwf and Pwr are high.

In the target flow rate calculation block QT, the target flow rate Qt is calculated based on the reference flow rate Qo and the front wheel and rear wheel adjustment flow rates Qf and Qr. The target flow rate Qt is the target value of the discharge flow rate of the electric pump DC (that is, the fluid pump HP). Specifically, the target flow rate Qt is determined by adding up the reference flow rate Qo and the front wheel and rear wheel adjustment flow rates Qf and Qr (that is, "Qt=Qo+Qf+Qr").

The target rotation speed calculation block NT, the actual rotation speed calculation block NA, and the rotation speed feedback control block NC are the same as those in the first embodiment. In the target rotation speed calculation block NT, the target flow rate Qt is converted into the target rotation speed Nt. In the actual rotation speed calculation block NA, the actual rotation speed Na is calculated based on the actual rotation angle Ka. In the rotation speed feedback control block NC, the rotation speed feedback control of the electric motor MC is executed such that the actual rotation speed Na of the electric pump DC approaches and matches the target rotation speed Nt. The switching element of the drive circuit DR is driven based on the drive signal Mc, and the electric motor MC is controlled.

When at least one of the front wheel and rear wheel hydraulic pressure change amounts dPf and dPr is larger than "0", a sum of the front wheel and rear wheel adjustment flow rates Qf, and Qr ("Qf+Qr", which is referred to as a "total flow rate") is calculated to be larger than "0". As the front wheel and rear wheel hydraulic pressure change amounts dPf and dPr increase (for example, when the brake operation member BP is suddenly operated and a sudden pressure increase is required), the total flow rate (Qf+Qr) of the front wheel and rear wheel adjustment flow rates Qf and Qr is determined to be larger, and the target rotation speed Nt is calculated to be larger. That is, the target rotation speed Nt of the electric pump DC (as a result, the actual rotation speed Na) is increased in accordance with a pressure increase gradient of the brake hydraulic pressure Pw, and the discharge flow rate thereof is increased. Meanwhile, "when the first and second adjustment hydraulic pressures Pb and Pc are maintained constant" and "when the first and second adjustment hydraulic pressures Pb and Pc are reduced", the reference flow rate Qo is sufficient for the discharge flow rate of the electric pump DC. In these cases, the total flow rate (Qf+Qr) is calculated to be "0", and the increased target rotation speed Nt is decreased.

The electric pump DC (in particular, the fluid pump HP) does not discharge any unnecessary flow rate, and the discharge flow rate of the electric pump DC is increased only when necessary. Therefore, the brake control device SC can be power saving while the pressure-rise responsiveness of the brake hydraulic pressure Pw is ensured. The front wheel and rear wheel target hydraulic pressures Ptf and Ptr are calculated according to the operation amount Ba or the front wheel and rear wheel target friction braking forces Fmf and Fmr. Therefore, the front wheel and rear wheel adjustment flow rates Qf and Qr (as a result, the total flow rate "Qf+Qr") can be calculated based on the time differential value (operation speed) dB of the operation amount Ba or time differential values (braking force change amounts) dFf and dFr of the front wheel and rear wheel target friction braking forces Fmf and Fmr. That is, at least one of the operation speed dB, the "front wheel and rear wheel braking force change amounts dFf and dFr", and the "front wheel and rear wheel hydraulic pressure change amounts dPf and dPr" is adopted as the "operation speed equivalent amount".

In the above description, when both the front wheel and rear wheel hydraulic pressure change amounts dPf and dPr are equal to or less than "0" (that is, when the brake operation member BP is held or returned), the target flow rate Qt is determined to be the reference flow rate Qo. Since the pressure adjustment unit YC is provided with the check valve GC, when the first and second pressure adjustment valves UB and UC are completely closed, the adjustment hydraulic pressures Pb and Pc can be kept constant. In addition, when the pressure adjustment valves UB and UC are slightly opened, the adjustment hydraulic pressures Pb and Pc can be gradually decreased. As in the first embodiment, when both the front wheel and rear wheel hydraulic pressure change amounts dPf and dPr (operation speed equivalent amounts) are equal to or less than "0" (that is, when the brake operation member BP is held or returned), the reference flow rate Qo is set to "0", and the target flow rate Qt can be calculated to be "0". Then "Nt=0" is calculated, and the rotation of the electric pump DC (=MC) is stopped. The adjustment hydraulic pressures Pb and Pc can be held or decreased by the check valve GC and the first and second pressure adjustment valves UB and UC. Therefore, when the brake operation member BP is held or returned, the electric motor MC is stopped, and further power saving can be achieved. When the brake hydraulic pressure Pw is increased from the state where the electric motor MC is stopped, the target flow rate Qt can be determined to be the sum (total flow rate) of the front wheel and rear wheel adjustment flow rates Qf and Qr (that is, "Qt=Qf+Qr").

<Driving Processing of First and Second Pressure Adjustment Valves UB and UC of Second Processing Example>

Figure 5:
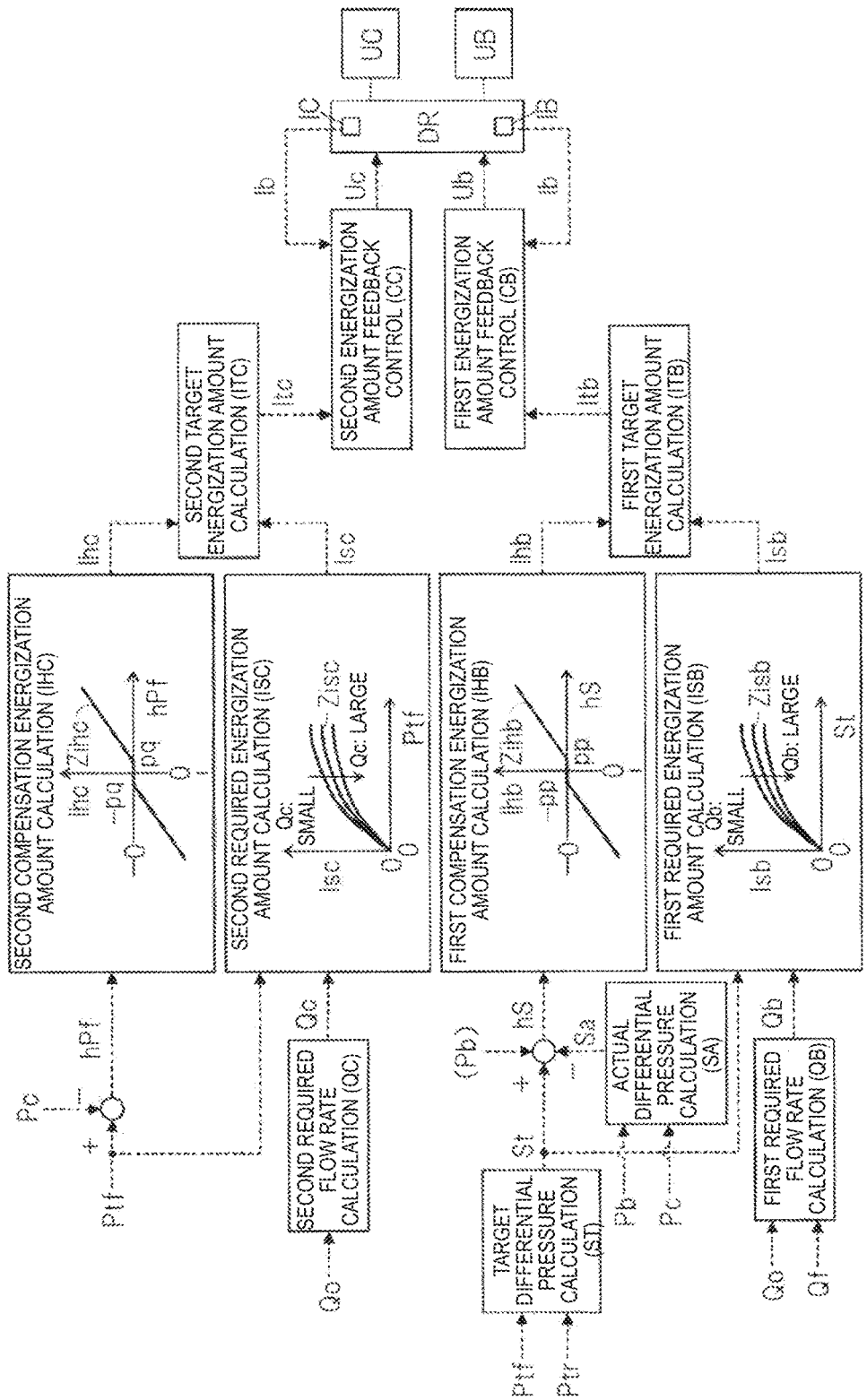
FIG. 5 is a functional block diagram for illustrating driving processing of first and second pressure adjustment valves UB, UC of the second processing example.

Driving processing of the first and second pressure adjustment valves UB and UC in the second processing example will be described with reference to a functional block diagram of FIG. 5. The processing includes a target differential pressure calculation block ST, an actual differential pressure calculation block SA, "first and second required flow rate calculation blocks QB and QC", "first and second required energization amount calculation blocks ISB and ISC", "first and second compensation energization amount calculation blocks IHB and IHC", "first and second target energization amount calculation blocks ITB and ITC", and "first and second energization amount feedback control blocks CB and CC".

In the target differential pressure calculation block ST, a target differential pressure St is calculated based on the front wheel target hydraulic pressure Ptf and the rear wheel target hydraulic pressure Ptr. The target differential pressure St is a target value of a hydraulic pressure difference between the first adjustment hydraulic pressure Pb and the second adjustment hydraulic pressure Pc. Specifically, the front wheel target hydraulic pressure Ptf is subtracted from the rear wheel target hydraulic pressure Ptr to determine the target differential pressure St (that is, "St=Ptr-Ptf"). In the actual differential pressure calculation block SA, an actual differential pressure Sa is calculated based on the first adjustment hydraulic pressure Pb and the second adjustment hydraulic pressure Pc. The actual differential pressure Sa is an actual hydraulic pressure difference between the first adjustment hydraulic pressure Pb and the second adjustment hydraulic pressure Pc corresponding to the target differential pressure St. The actual differential pressure Sa is determined by subtracting the second adjustment hydraulic pressure Pc (detected value of the second adjustment hydraulic pressure sensor PC) from the first adjustment hydraulic pressure Pb (detected value of the first adjustment hydraulic pressure sensor PB) (that is, "Sa=Pb-Pc"). In the case where the master cylinder hydraulic pressure sensor PQ is used instead of the second adjustment hydraulic pressure sensor PC, "Sa=Pb-Pm" is calculated.

In the first required flow rate calculation block QB, a first required flow rate Qb is calculated based on the reference flow rate Qo and the front wheel adjustment flow rate Qf. The first required flow rate Qb is a target value of a flow rate required for the first pressure adjustment valve UB. Specifically, the first required flow rate Qb (the target value of the flow rate passing through the first pressure adjustment valve UB) is calculated by adding up the reference flow rate Qo and the front wheel adjustment flow rate Qf (that is, "Qb=Qo+Qf"). That is, the rear wheel adjustment flow rate Qr is supplied to the rear wheel cylinder CWr, and the first required flow rate Qb including the front wheel adjustment flow rate Qf is flowed to the first pressure adjustment valve UB.

In the same way, in the second required flow rate calculation block QC, a second required flow rate Qc is calculated based on the reference flow rate Qo. The second required flow rate Qc is a target value of a flow rate required for the second pressure adjustment valve UC. Specifically, the reference flow rate Qo is directly determined as the second required flow rate Qc (the target value of the flow rate passing through the second pressure adjustment valve UC) (that is, "Qc=Qo"). That is, the front wheel adjustment flow rate Qf is supplied to the servo chamber Rs, and the second required flow rate Qc (=Qo) is supplied to the second pressure adjustment valve UC.

In the first required energization amount calculation block ISB, a first required energization amount Isb is calculated based on the target differential pressure St, the first required flow rate Qb, and a calculation map Zisb. The first required energization amount Isb is a target value of an energization amount (current) supplied to the first pressure adjustment valve UB. The first required energization amount Isb is determined to monotonically increase from "0" according to an "upward protruding" characteristic as the target differential pressure St increases from "0" in accordance with the calculation map Zisb. In addition, the first required energization amount Isb is determined, according to the calculation map Zisb, to be larger as the first required flow rate Qb decreases, and is determined to be smaller as the first required flow rate Qb increases. Since the first pressure adjustment valve UB is normally-opened, the first required energization amount Isb is calculated to be smaller as the first required flow rate Qb increases, and the valve opening amount of the first pressure adjustment valve UB is increased.

In the same way, in the second required energization amount calculation block ISC, a second required energization amount Isc is calculated based on the front wheel target hydraulic pressure Ptf, the second required flow rate Qc, and a calculation map Zisc. The second required energization amount Isc is a target value of an energization amount (current) supplied to the second pressure adjustment valve UC. The second required energization amount Isc is determined to monotonically increase from "0" according to the "upward protruding" characteristic as the front wheel target hydraulic pressure Ptf increases from "0" in accordance with the calculation map Zisc. As the first pressure adjustment valve UB, the second required energization amount Isc is determined to be larger as the second required flow rate Qc decreases, and is determined to be smaller as the second required flow rate Qc increases.

In the first compensation energization amount calculation block IHB, a first compensation energization amount Ihb is calculated based on a deviation hS between the target differential pressure St and the actual differential pressure Sa and a calculation map Zihb. The first compensation energization amount Ihb is a target value of an energization amount (current) supplied to the first pressure adjustment valve UB to cause the actual differential pressure Sa to match the target differential pressure St. The actual differential pressure Sa is subtracted from the target differential pressure St to calculate the differential pressure deviation hS (that is, "hS=St-Sa"). When the deviation hS is equal to or less than a predetermined value "-pp" and the deviation hS is equal to or greater than a predetermined value pp, the first compensation energization amount Ihb is determined to increase as the differential pressure deviation hS increases. In addition, in a range where the deviation hS is between the predetermined value "-pp" and the predetermined value pp, the first compensation energization amount Ihb is determined to be "0". Here, the predetermined value pp is a preset positive constant. The differential pressure deviation hS may also be determined by subtracting the first adjustment hydraulic pressure Pb (detected value of the first adjustment hydraulic pressure sensor PB) from the target differential pressure St (that is, "hS=St−Pb").

In the same way, in the second compensation energization amount calculation block IHC, a second compensation energization amount Ihc is calculated based on a deviation hPf between the front wheel target hydraulic pressure Ptf and the second adjustment hydraulic pressure Pc and a calculation map Zihc. The second compensation energization amount Ihc is a target value of an energization amount (current) supplied to the second pressure adjustment valve UC to cause the second adjustment hydraulic pressure Pc to match the front wheel target hydraulic pressure Ptf. The second adjustment hydraulic pressure Pc (detected value of the second adjustment hydraulic pressure sensor PC) is subtracted from the front wheel target hydraulic pressure Ptf to calculate the hydraulic pressure deviation hPf (that is, "hPf=Ptf−Pc"). When the deviation hPf is equal to or less than a predetermined value "−pq" and the deviation hPf is equal to or greater than a predetermined value pq, the second compensation energization amount Ihc is determined to increase as the deviation hPf increases. In addition, in a range where the hydraulic pressure deviation hPf is between the predetermined value "−pq" and the predetermined value pq, the second compensation energization amount Ihc is determined to be "0". Here, the predetermined value pq is a preset positive constant.

In the first target energization amount calculation block ITB, a first target energization amount Itb is calculated based on the first required energization amount Isb and the first compensation energization amount Ihb. The first target energization amount Itb is a target value of an energization amount (current) supplied to the first pressure adjustment valve UB. Specifically, the first required energization amount Isb and the first compensation energization amount Ihb are added together to calculate the first target energization amount Itb (that is, "Itb=Isb+Ihb"). In the same way, in the second target energization amount calculation block ITC, a second target energization amount Itc is calculated based on the second required energization amount Isc and the second compensation energization amount Ihc. The second target energization amount Itc is a target value of an energization amount (current) supplied to the second pressure adjustment valve UC. The second target energization amount Itc is determined by adding up the second required energization amount Isc and the second compensation energization amount Ihc (that is, "Itc=Isc+Ihc").

In the first energization amount feedback control block CB, energization amount feedback control of the first pressure adjustment valve UB is executed based on the first target energization amount Itb and a first actual energization amount Ib. That is, the drive signal Ub is determined such that the first actual energization amount Ib approaches and matches the first target energization amount Itb. Here, the first actual energization amount Ib is detected by a first actual energization amount sensor IB provided in the drive circuit DR. The drive circuit DR is driven based on the drive signal Ub, and the first pressure adjustment valve UB is controlled. In the same way, in the second energization amount feedback control block CC, energization amount feedback control of the second pressure adjustment valve UC is executed based on the second target energization amount Itc and a second actual energization amount Ic such that the second actual energization amount Ic approaches and matches the second target energization amount Itc. The second actual energization amount Ic is detected by a second actual energization amount sensor IC provided in the drive circuit DR, and the drive circuit DR is driven based on the drive signal Uc calculated by the second energization amount feedback control block CC to control the second pressure adjustment valve UC. As a result, the first and second adjustment hydraulic pressures Pb and Pc are controlled to approach and match the rear wheel and front wheel target hydraulic pressures Ptr and Ptf.

In the second processing example, when the required braking force Fd corresponding to the operation amount Ba is equal to or less than the regenerative braking force (maximum regenerative force) Fx generable by the generator GN, control is performed such that "Pb=Pc=0", and the friction braking force Fm is not generated. When the operation amount Ba is increased and the regenerative braking force Fg exceeds the maximum regenerative force Fx, the required braking force Fd cannot be achieved by the regenerative braking force Fg. In this case, the friction braking force Fmr of the rear wheel WHr is increased by the first adjustment hydraulic pressure Pb so as to correspond to a shortage of the regenerative braking force Fg with respect to the required braking force Fd (that is, "Fd−Fx"). At this time, "Pc=0" is maintained, only the regenerative braking force is applied to the front wheel WHf, and the friction braking force Fmf is not generated. A ratio of a front wheel braking force to the total braking force F (front wheel ratio) Hf (=1−Hr) is gradually decreased from 100% when the friction braking force Fmr of the rear wheel WHr is sequentially increased. When the operation amount Ba is further increased and the front wheel ratio Hf reaches a predetermined ratio (constant) hf (=1−hr) set in advance, the second adjustment hydraulic pressure Pc starts to increase from "0". As the second adjustment hydraulic pressure Pc increases, the friction braking force Fmf of the front wheel WHf is increased. Therefore, while maintaining the maximum value Fx of the regenerative braking force Fg, the front and rear distribution ratios Hf and Hr are maintained at desired values hf and hr.

In other words, the front wheel hydraulic pressure Pwf and the rear wheel hydraulic pressure Pwr are individually adjusted by the first and second adjustment hydraulic pressures Pb and Pc. Specifically, as the operation amount Ba increases, a generation state of the braking force is changed in an order of "only the regenerative braking force Fg of the front wheel WHf generated by the generator GN" to "(regenerative braking force Fg of the front wheel WHf)+(friction braking force of the rear wheel WHr generated by the first adjustment hydraulic pressure Pb)" to "(regenerative braking force Fg of the front wheel WHf)+(friction braking force of the front wheel WHf generated by the second adjustment hydraulic pressure Pc)+(friction braking force of the rear wheel WHr)". As a result, sufficient regenerative energy is ensured, and the front-rear distribution of the braking force is appropriate, so that the deceleration and directional stability of the vehicle can be ensured.

In the second embodiment, since the first and second pressure adjustment valves UB and UC are arranged in series in the recirculation path (A), even if the first adjustment hydraulic pressure Pb on the upstream side is kept constant, the first adjustment hydraulic pressure Pb is changed due to hydraulic pressure interference when the second adjustment hydraulic pressure Pc on the downstream side is changed (increased). For example, such a situation may occur during a replacement operation of the regenerative cooperative control. In the second processing example, the first and second pressure adjustment valves UB and UC are driven and controlled based on the required flow rates (first and second required flow rates) Qb and Qc. That is, control in which the flow rates Qb and Qc to be flowed in the first and second pressure adjustment valves UB and UC are taken into consideration is executed. In particular, on the downstream side of the first pressure adjustment valve UB located on the upstream side, the valve opening amount thereof is controlled based on the front wheel adjustment flow rate (flow rate to be supplied to the servo chamber Rs) Qf that is necessary for increasing the front wheel brake hydraulic pressure Pwf. Therefore, mutual interference in hydraulic pressure control is prevented, and pressure adjustment accuracy can be improved.

<Operation and Effects of Brake Control Device SC>

Figure 6:
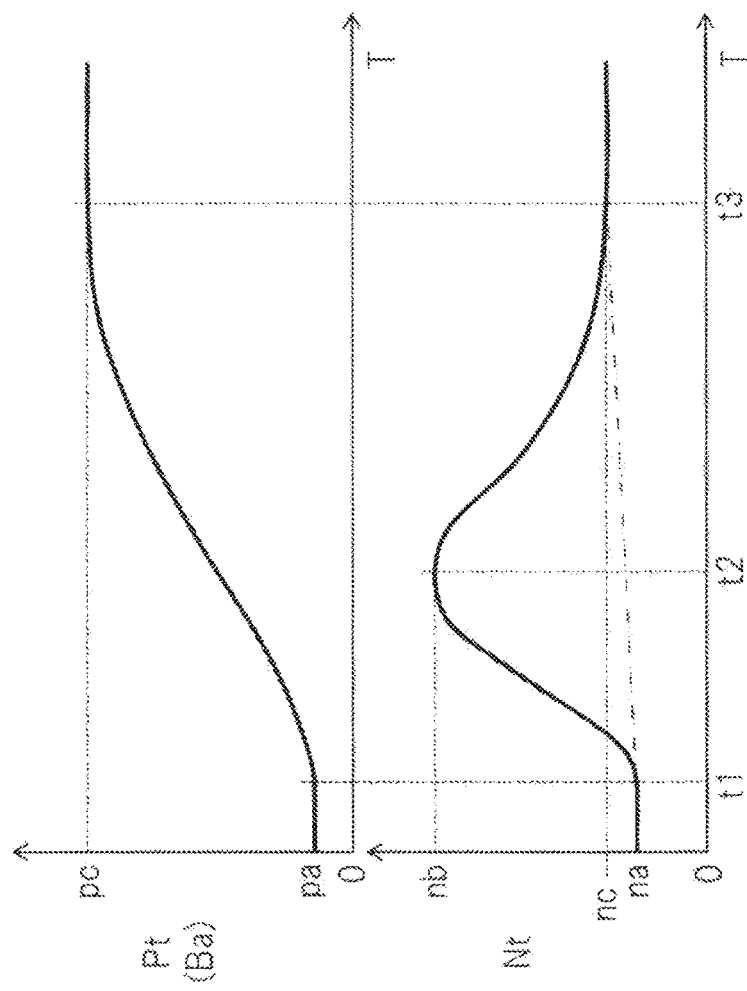
FIG. 6 is a time series diagram for illustrating operation and effects.

Operation and effects of the brake control device SC will be described with reference to a time series diagram of FIG. 6. The diagram corresponds to the first embodiment, and a situation where the operation amount Ba is increased from a state where the driver holds the brake operation member BP and then the brake operation member BP is held again is assumed.

Since the operation amount Ba is constant until a time point t1, the target hydraulic pressure Pt is maintained at a value pa. Since the hydraulic pressure change amount (operation speed equivalent amount) dP is "0", the target rotation speed Nt is maintained at a value na such that the electric motor MC supplies the reference flow rate Qo. Alternatively, since the operation amount Ba is constant and "dP=0", "Qo=0" is set, the electric motor MC may be stopped (that is, "Nt=0"). From the time point t1, the operation amount Ba is increased, and the target hydraulic pressure Pt is increased. Accordingly, since the hydraulic pressure change amount dP is increased from "0", the adjustment flow rate Qh is increased from "0". That is, in a case where "dP>0", the target flow rate Qt (=Qo+Qh) is increased, so that the target rotation speed Nt is increased. The flow rate of the brake liquid BF corresponding to the adjustment flow rate Qh (volume moved during an unit time) is supplied to the wheel cylinder CW, and the adjustment hydraulic pressure Pa (=Pw) is increased.

At an initial stage of the increase in the operation amount Ba, an increase gradient thereof (time change amount) is large, and the hydraulic pressure change amount dP (operation speed equivalent amount) is determined to be large, so that the target rotation speed Nt is rapidly increased. Since the increase gradient is decreased in a late stage of the increase in the operation amount Ba, the hydraulic pressure change amount dP is gradually decreased. Therefore, from a time point t2, the target rotation speed Nt is gradually decreased from a value nb. At a time point t3, the operation amount Ba is kept constant. Since "dP=0" is calculated, the target rotation speed Nt is maintained at a value nc. That is, when the operation amount Ba is increased from the state where an operation of the brake operation member BP is kept constant (including timing when not braking), the electric pump rotation speeds Nt and Na are increased. Thereafter, when the operation of the brake operation member BP is held so as to keep the brake hydraulic pressure Pw constant, the electric pump rotation speeds Nt and Na are decreased.

The rotation speeds Nt and Na of the electric pump DC are increased only when an increase in the brake hydraulic pressure Pw is required, so that power saving of the brake control device SC can be achieved. In addition, the rotation speeds Nt and Na of the electric pump DC increase as the operation speed equivalent amount (hydraulic pressure change amount) dP increases. Therefore, even when the brake operation member BP is suddenly operated, a sufficient liquid amount (volume of the brake liquid BF) is supplied to the wheel cylinder CW, the brake hydraulic pressure Pw is rapidly increased, and responsiveness thereof is ensured. In addition, since a time delay in hydraulic pressure feedback control based on the deviation hP (or hPf, hS) is reduced, pressure adjustment accuracy of the brake hydraulic pressure Pw is improved.

OTHER EMBODIMENTS

Hereinafter, other embodiments will be described. In other embodiments, the same effects as described above (ensuring the pressure-rise responsiveness and power saving of the device) are also achieved.

A combination of the tandem type master cylinder CM and the pressure adjustment unit YA in the first embodiment and a combination of the single type master cylinder CM and the pressure adjustment unit YC in the second embodiment are exemplified. These configurations can be combined. In the equivalent pressure adjustment, the master unit YM having the tandem type master cylinder CM and the pressure adjustment unit YA can be combined. In this configuration, the adjustment hydraulic pressure Pa is supplied to the servo chamber Rs. In the independent pressure adjustment, the pressure adjustment unit YC is combined with the tandem type master cylinder CM in which the front and rear type fluid path is employed. The first adjustment hydraulic pressure Pb is supplied to the rear wheel wheel cylinder CWr, and the second adjustment hydraulic pressure Pc is supplied to the front wheel wheel cylinder CWf.

In the above embodiments, the generator GN is provided in the front wheel WHf, and may be provided in the rear wheel WHr. In addition, the brake control device SC may also be applied to a vehicle having a general internal combustion engine that does not have the generator GN. In this case, since the regenerative braking by the generator GN is not generated, the regenerative cooperative control is not executed in the brake control device SC. That is, the vehicle is decelerated only by the friction braking force.

The invention claimed is:

1. A brake control device for a vehicle that adjusts a hydraulic pressure in a wheel cylinder in response to an operation amount of a vehicle brake operation member, the brake control device for the vehicle comprising:

a pressure adjustment unit including an electric pump and first and second pressure adjustment valves, and configured to adjust hydraulic pressure in a pressure adjustment fluid path between the electric pump and the two pressure adjustment valves, the two pressure adjustment valves provided in series in the pressure adjustment fluid path; and a controller configured to control the electric pump and the two pressure adjustment valves, wherein the controller is configured to calculate a reference flow rate based on the operation amount, calculate an operation speed equivalent amount which is a state quantity corresponding to an operation speed of the brake operation member, by using a value corresponding to a change in the operation amount per unit time, calculate a front wheel adjustment flow rate and a rear wheel adjustment flow rate based on the operation speed equivalent amount, the front wheel adjustment flow rate being a target value of a discharge flow rate of the electric pump which is necessary for increasing a second adjustment hydraulic pressure between the first pressure adjustment valve and the second pressure adjustment valve, and the rear wheel adjustment flow rate being a target value of the discharge flow rate of electric pump which is necessary for increasing a first adjustment hydraulic pressure between the electric pump and the first pressure adjustment valve, calculate a target rotation speed by using the reference flow rate and the front wheel and rear wheel adjustment flow rates, and control the electric pump such that an actual rotation speed of the electric pump approaches the target rotation speed.

2. The brake control device for a vehicle according to claim 1, wherein the controller is configured to increase the target rotation speed as the operation speed equivalent amount increases when the operation speed equivalent amount is larger than zero, and reduce the target rotation speed when the operation speed equivalent amount is equal to or less than zero.

* * * * *